(12) United States Patent
Henry et al.

(10) Patent No.: US 12,418,845 B2
(45) Date of Patent: Sep. 16, 2025

(54) WIRELESS LOCAL AREA NETWORK (WLAN) ROAMING OPTIMIZATIONS UTILIZING A RECONFIGURABLE INTELLIGENT SURFACE (RIS) DEVICE

(71) Applicant: Cisco Technology, Inc., San Jose, CA (US)

(72) Inventors: Jerome Henry, Pittsboro, NC (US); Robert Edgar Barton, Richmond (CA); Indermeet Singh Gandhi, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 414 days.

(21) Appl. No.: 18/150,409

(22) Filed: Jan. 5, 2023

(65) Prior Publication Data

US 2024/0236784 A1    Jul. 11, 2024

(51) Int. Cl.
*H04W 36/00*    (2009.01)
*H04W 36/30*    (2009.01)
*H04W 36/32*    (2009.01)

(52) U.S. Cl.
CPC ..... *H04W 36/00837* (2018.08); *H04W 36/30* (2013.01); *H04W 36/32* (2013.01)

(58) Field of Classification Search
None
See application file for complete search history.

(56) References Cited

U.S. PATENT DOCUMENTS

2022/0077919 A1    3/2022    Li et al.

FOREIGN PATENT DOCUMENTS

| WO | 2021/239259 A1 | 12/2021 |
|---|---|---|
| WO | 2022/015965 A1 | 1/2022 |
| WO | 2022/093380 A1 | 5/2022 |
| WO | 2022/133952 A1 | 6/2022 |
| WO | 2022/133957 A1 | 6/2022 |
| WO | 2022/183394 A1 | 9/2022 |

OTHER PUBLICATIONS

Marathe, "802.11v BSS Transition Management," https://wifiwiki.wordpress.com/2020/04/27/802-11v-wireless-network-management/, Apr. 27, 2020, 8 pages.
Wu, et al., "Intelligent Reflecting Surface Enhanced Wireless Network via Joint Active and Passive Beamforming," https://arxiv.org/abs/1810.03961, Aug. 12, 2019, 35 pages.
Gast, "Chapter 4. Beamforming in 802.11ac," 802.11ac: A Survival Guide, Aug. 2013, 38 pages.
7Signal, "MCS Index and 7MCS™ Wi-Fi Experience Score," https://www.7signal.com/info/mcs, retrieved from the Internet Dec. 21, 2022, 5 pages.

(Continued)

*Primary Examiner* — Abdelillah Elmejjarmi
(74) *Attorney, Agent, or Firm* — Edell, Shapiro & Finnan, LLC

(57) ABSTRACT

Provided herein are techniques through which coordinated steering of a Reconfigurable Intelligent Surface (RIS) device can be utilized according to prioritized time-slices determined for each of multiple wireless access points (APs) for a wireless local area network (WLAN). Coordinated steering of an RIS device by multiple wireless APs according to prioritized time-slices may facilitate seamless roaming for wireless clients between the wireless APs for the WLAN.

20 Claims, 8 Drawing Sheets

(56) References Cited

OTHER PUBLICATIONS

Staat, et al., "Mirror, Mirror on the Wall: Wireless Environment Reconfiguration Attacks Based on Fast Software-Controlled Surfaces," ASIA CCS '22: Proceedings of the 2022 ACM on Asia Conference on Computer and Communications Security, May 2022, 14 pages.
Liu, et al., "Reconfigurable Intelligent Surfaces: Principles and Opportunities," IEEE Communications Surveys & Tutorials, vol. 23, No. 3, May 5, 2021, 32 pages.
Lin, et al., "Reconfigurable Intelligent Surfaces With Reflection Pattern Modulation: Beamforming Design and Performance Analysis," IEEE Transactions on Wireless Communications, vol. 20, No. 2, Feb. 11, 2021, 14 pages.
Daniel, "Wi-Fi 6 vs. Wi-Fi 5 Key Changes to the RF Physical Layer," https://www.litepoint.com/blog/wi-fi-6-vs-wi-fi-5-key-changes-to-the-rf-physical-layer/, May 25, 2021, 12 pages.
Khorov, et al., "Current Status and Directions of IEEE 802.11be, the Future Wi-Fi 7," IEEE Access, May 21, 2020, 25 pages.
Bhandaru, et al., "Pre-Association Security Negotiation (PASN) for 11az," https://mentor.ieee.org/802.11/dcn/17/11-17-1737-00-00az-pre-association-security-negotiation-for-11az.pptx, Oct. 16, 2017, 14 pages.
Bourdoux, et al., "6G White Paper on Localization and Sensing," https://arxiv.org/abs/2006.01779, Jun. 2, 2020, 38 pages.

WIRELESS LOCAL AREA NETWORK (WLAN) ROAMING OPTIMIZATIONS UTILIZING A RECONFIGURABLE INTELLIGENT SURFACE (RIS) DEVICE

TECHNICAL FIELD

The present disclosure relates to wireless network equipment and services.

BACKGROUND

Reconfigurable Intelligent Surface (RIS) devices, also known as Intelligent Reflecting Surface (IRS) devices, have recently attracted attention for use in cellular networks, such as Third Generation Partnership Project (3GPP) Fifth Generation (5G) or next Generation (nG) networks. An RIS device typically utilizes low-cost, passive phase shifting reflecting elements that allow the RIS device to reflect electromagnetic energy/waves through phase adjustments of the reflecting elements in order to direct the electromagnetic energy/waves in a particular direction.

DETAILED DESCRIPTION

Overview

Figure 1:
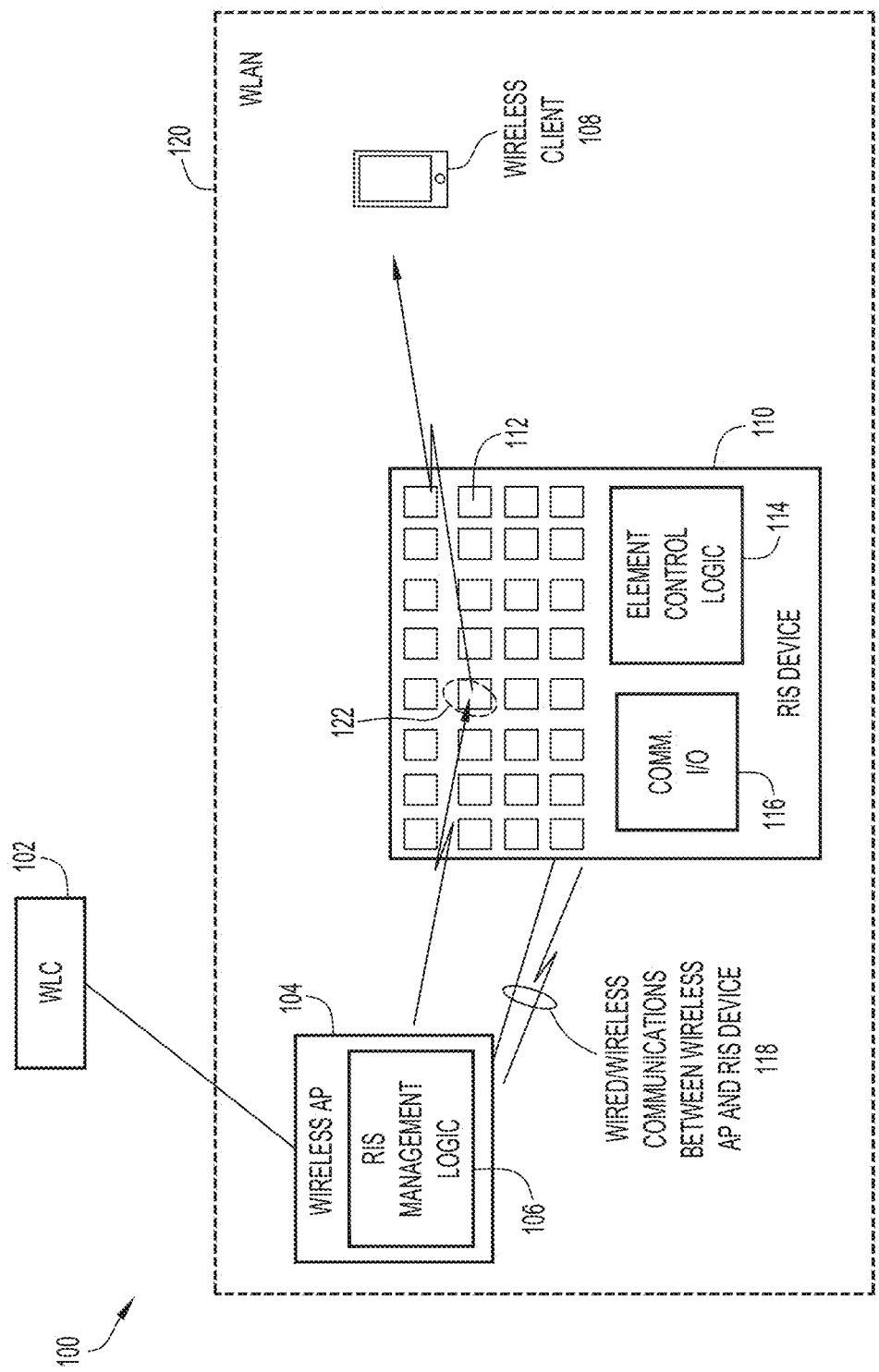
FIG. 1 is a block diagram of a system that may facilitate wireless local area network (WLAN) optimizations utilizing one or more Reconfigurable Intelligent Surface (RIS) devices, according to an example embodiment.

Embodiments disclosed herein may facilitate techniques through which a Reconfigurable Intelligent Surface (RIS) device can be controlled to facilitate various wireless local area network (WLAN) communication optimizations. In some embodiments, coordinated steering techniques can be utilized for an RIS device in order to optimize signals transmitted to/from wireless client(s) in communication with a wireless access point (AP) for a WLAN. In some embodiments, coordinated steering of an RIS device can be provided in a prioritized time-sliced manner between at least two wireless APs in order to optimize communications between the wireless APs and wireless client(s) served thereby for a WLAN. In still some embodiments, coordinated steering of an RIS device utilizing prioritized time slices of the RIS device can be provided in order to facilitate seamless roaming between a first (i.e., source) wireless AP and a second (i.e., target) wireless AP for wireless client(s) in a WLAN.

In one embodiment, a computer-implemented method is provided that may include determining prioritized time-slices for utilizing a Reconfigurable Intelligent Surface (RIS) device by at least a first wireless access point (AP) and a second wireless AP for a wireless local area network, wherein the first wireless AP is provided a first prioritized time-slice in which to utilize the RIS device and the second wireless AP is provided a second prioritized time-slice in which to utilize the RIS device; determining that a wireless client having a first communication session involving the first wireless AP is to be transitioned to a second communication session involving the second wireless AP, wherein the first wireless AP utilizes a first configuration of a plurality of configurable reflecting elements of the RIS device for communications with the wireless client via the first communication session during the first prioritized time-slice for utilizing the RIS device; identifying a second configuration of the plurality of configurable reflecting elements of the RIS device to facilitate the second communication session for the wireless client involving the second wireless AP; and triggering the wireless client to roam from the first wireless AP to the second wireless AP for establishing the second communication session involving the second wireless AP, wherein the second wireless AP utilizes the second configuration of the plurality of configurable reflecting elements of the RIS device for communications with the wireless client via the second communication session during the second prioritized time-slice for utilizing the RIS device.

Example Embodiments

Reconfigurable Intelligent Surface (RIS) devices, also known as Intelligent Reflecting Surface (IRS) devices, are considered a promising technology that can be utilized for enhancing the quality of the spectrum and/or the energy efficiency of wireless communication systems. RIS devices have primarily been studied in the context of Third Generation Partnership Project (3GPP) Fifth Generation (5G) and Next Generation (NG) Radio Access Technology (RAT)/Radio Access Network (RAN) types. However, as discussed for embodiments herein, RIS devices may also be utilized in the context of wireless local area network (WLAN) radio communication systems, such as Institute of Electrical and Electronics Engineers (IEEE) 802.11 (Wi-Fi®) radio communication systems, such as Wi-Fi 6, 6E, 7, 8 (currently being explored in 802.11 Wireless Next Generation (WNG) studies), and/or any other next generation 802.11 radio communication technology, such that future 802.11 amendments will likely strive to integrate RIS devices into WLAN (802.11/Wi-Fi) communication systems.

An RIS device is typically formed of arrays of phase-tunable unit cells (reflecting elements) provided on a standard (e.g., Flame Retardant-4 (FR4 printed circuit board (PCB) substrate. A PIN diode (a diode having p-type semiconductor region and an n-type semiconductor region with an undoped intrinsic semiconductor region between the p-type and n-type semiconductor regions) attached to each reflecting element can switch a parasitic element to each reflecting element, thereby allowing each reflecting element to switch its resonance frequency and reflect electromagnetic energy/waves through phase adjustments of the various reflecting elements in order to direct the electromagnetic energy/waves in a particular direction.

A microcontroller or other control logic in communication with/configured for an RIS can be used to coordinate the angle at which each reflecting element will reflect a received signal. A configuration interface can also be provided for an RIS device, such as a serial connection to the board, a network connection, or the like.

Systems and methods are presented herein that leverage one or more RIS devices to facilitate various WLAN optimizations. In some embodiments, coordinated steering techniques can be utilized for an RIS device in order to optimize signals transmitted between a wireless access point (AP) and one or more wireless client(s) for a WLAN.

In a conventional deployment, an RIS device may be associated with a single wireless AP (e.g., for a goal of extending coverage of the wireless AP to a specific target location, commonly hidden behind one or more obstacles) or positioned between two wireless APs (e.g., for a goal of determining a mean angle that maximizes signal coverage for devices at the edge of both cells). However, it would be advantageous to utilize an RIS device in a manner that accounts for roaming client(s) such that the RIS device can be utilized to facilitate the seamless movement of wireless client(s) from one AP to another AP.

Accordingly, in some embodiments provided herein, coordinated steering of an RIS device can be provided in a prioritized time-sliced manner between at least two wireless APs in order to optimize communications between the wireless APs and wireless client(s) served thereby for a WLAN. In some embodiments provided herein, coordinated steering of an RIS device utilizing prioritized time-slices of the RIS device can be provided in order to facilitate seamless transitions or roaming between a first (i.e., source) wireless AP and a second (i.e., target) wireless AP for wireless client(s) in a WLAN.

With reference to FIG. 1, FIG. 1 is a block diagram of a system 100 that may facilitate WLAN optimizations utilizing one or more RIS devices, according to an example embodiment. As illustrated in FIG. 1, system 100 may include a wireless local area network (LAN) controller (WLC) 102 and a wireless local area network (WLAN) 120 that include at least one wireless access point (AP) 104. Also shown in FIG. 1 is a wireless client 108 and at least one RIS device 110. It is to be understood that the number of wireless APs and wireless clients shown in FIG. 1 is provided for illustrative purposes only and is not meant to limit the broad scope of the present disclosure; any number of wireless APs may be configured for WLAN 120 and any number of wireless clients may be present within the WLAN 120. Further, there may be any number of RIS devices 110 deployed in the WLAN 120.

In the ensuing description, a wireless client, such as wireless client 108, may be considered a wireless device, a wireless client device, a wireless station (STA), etc. and, thus, can be referred to interchangeably as a 'client device', 'wireless client', 'client', 'wireless STA', 'wireless client STA', and 'wireless client device', 'a client device configured to communicate wirelessly', and variations thereof. Further, a wireless AP, such as wireless AP 104, may be referred to interchangeably as an 'AP', a 'wireless radio', a 'radio', a 'radio node', and variations thereof.

For the embodiment of FIG. 1, WLC 102 interfaces with wireless AP 104. Wireless AP 104 may further interface with RIS device 110 utilizing any combination of wired and/or wireless communication interfaces. WLC 102 may also interface with RIS device 110 in accordance with various embodiments herein.

As illustrated in FIG. 1, wireless AP 104 can be configured with RIS management logic 106, which can facilitate the management of RIS device 110, as discussed in further detail herein, below. Additionally, wireless AP 104 may be configured with any combination of hardware (e.g., communications units, receiver(s), transmitter(s), antenna(s) and/or antenna array(s), processor(s), memory element(s), baseband processor(s) (modems), etc.), controllers (e.g., WLAN/802.11 controllers, wired network controllers, etc.), software, logic, and/or any other elements/logic that may facilitate wireless and/or wired communications with one or more elements of system 100.

Generally, for a WLAN, such as WLAN 120, WLC 102 communicates with and controls the wireless AP 104, which serves WLAN 120 within which wireless clients, such as wireless client 108 can wireless connect to and be served by wireless AP 104. WLC 102 may also serve as a bridge to transport traffic for wireless client 108 communicated between WLAN 120/wireless AP 104 and one or more data networks (not shown), which may include one or more wide area networks (WANs), such as the Internet, and/or one or more LANs. Wireless AP 104 may provide wireless connectivity, such as IEEE 802.11 wireless connectivity (including any 802.11 variants thereof) for wireless client 108 to access one or more data networks via WLC 102. WLC 102 and wireless AP 104 may be referred to herein as a 'wireless infrastructure' or 'wireless network infrastructure'.

During operation of WLAN 120, wireless client 108 can perform 802.11 association and authentication procedures via wireless AP 104 in order to wirelessly attach/connect to WLAN 120, which is under control and configuration of WLC 102 such that the wireless client 108 to establish communication Ls within system 100. Once authenticated, wireless client 108 may exchange packets with one or more networks through wireless AP 104 and WLC 102 during the communication sessions.

RIS device 110 can be considered a metasurface device with an array or matrix of engineered sub-wavelength configurable reflecting elements 112 (e.g., an M×N (row× column) array or matrix or multiple arrays/matrices), such as microstrip patches, whose reflective properties can be programmatically controlled using a tunable chip in the configurable reflecting elements 112 by changing the load impedance. RIS device 110 can be configured with element control logic 114 and one or more communication input/output (I/O) 116 interfaces. It is to be understood that the configuration of configurable reflecting elements 112 is provided for illustrative purposes only and is not meant to limit the broad scope of embodiments herein. Configurable reflecting elements 112 of RIS device 110 may be configured in any manner in accordance with embodiments herein, which may or may not be inclusive of any number of M×N array(s), array configurations having different numbers of rows/columns, non-M×N array configurations, combinations thereof, and/or the like.

The matrix or array of configurable reflecting elements 112 of RIS device 110 can be controlled using the element control logic 114. The configurable reflecting elements 112 of RIS device 110 are passive insofar as the elements reflect (without receiving and demodulating/processing) electromagnetic energy/waves by adjusting phase of the various configurable reflecting elements 112 to direct the electromagnetic energy/waves in a particular direction, such as towards a wireless client, such as wireless client 108, as generally illustrated at 122.

In accordance with embodiments herein, RIS device 110 may be capable of receiving and transmitting IEEE 802.11 communications via communication (Comm.) I/O 116 and can therefore act as an 802.11 wireless device or STA, although the medium through which communications to/from RIS device may be facilitated may include any combination of wired and/or wireless communications, as generally illustrated at 118. Accordingly, communication I/O 116 may include any combination of hardware (e.g., communications units, receiver(s), transmitter(s), antenna(s) and/or antenna array(s), processor(s), memory element(s), baseband processor(s) (modems), etc.), controllers (e.g., WLAN/802.11 controllers, wired network controllers, etc.), software, logic, and/or any other elements/logic that may facilitate wireless and/or wired communications and/or connections with RIS device 110.

Although RIS device 110 is illustrated in FIG. 1 as being (internally) configured with communication I/O 116 to facilitate wired and/or wireless communications between wireless AP 104 and RIS device 110, in some embodiments one or more elements of communication I/O 116 that may facilitate communications with wireless AP 104 may be provided external to RIS device 110 such that RIS device 110 can interface with the externally configured elements of communication I/O 116 that facilitate communications with wireless AP 104.

Similarly, although element control logic 114 is illustrated in FIG. 1 as be configured (internally) for RIS device 110, in some embodiments, element control logic 114 may be configured external to RIS device 110 and may be in communication with RIS device 110 in order to facilitate control of configurable reflecting elements 112. In some embodiments, element control logic 114 may be configured external to RIS device 110 and may control configurable reflecting elements 112 of RIS device 110, as well as configurable reflecting elements of one or more other RIS devices.

Thus, in accordance with embodiments herein, RIS device 110 can be considered attached to or otherwise interfacing with (e.g., via an 802.11 association) wireless AP 104 via a wired or wireless client that can be provided any configuration of communication I/O 116 such that wireless AP 104 can, via RIS management logic 106, manage/control RIS device 110 to facilitate optimal steering of configurable reflecting elements 112 in order to provide improved wireless communications between wireless AP and one or more wireless clients, such as wireless client 108.

Generally, wireless client 108 may be associated with any person, user, subscriber, employee, customer, and/or the like and may be inclusive of any device that initiates a communication in the system, such as a computer, a laptop or electronic notebook, a cellular/Wi-Fi enabled telephone/smart phone, tablet, etc. and/or any other device (e.g., any Internet of Things (IoT) device or machine, etc.), component, element, or object capable of performing voice, audio, video, media, or data exchanges within system 100. Wireless clients discussed herein may include corresponding communication input/output (I/O) interface(s) each of which may include any combination of hardware (e.g., communications units, receiver(s), transmitter(s), antenna(s) and/or antenna array(s), processor(s), memory element(s), baseband processor(s) (modems), etc.), controllers (e.g., WLAN/802.11 controllers, cellular controllers, wired controllers, etc.), software, logic, and/or any other elements/logic that may facilitate wireless and/or wired communications and/or connections among one or more elements of system 100.

Conventionally, configurable reflecting elements of RIS devices can be configured statically to provide a single reflection angle or can be configured using a pre-determined sequence in time and/or space domains to provide fast sweeps through different reflection angles (e.g., for jamming purposes, etc.). In the time domain, all the configurable reflecting elements can cause the same reflection angle for an AP signal and can all be changed together to provide a new angle. In the space domain, a first ($i^{th}$) reconfigurable reflecting element, which may be denoted ($M_i,N_i$), may not have the same angle effect as a second ($j^{th}$) reconfigurable element ($M_j,N_j$), thus at a given point in time a AP signal can be reflected differently on individual elements of the array, thereby reflecting the AP signal in different directions. In accordance with embodiments herein, coordinated steering techniques are provided in order to allow wireless AP 104, via RIS management logic 106, to leverage the RIS device 110 in order to optimize transmissions to and from wireless client 108 for WLAN 120.

Figure 2A:
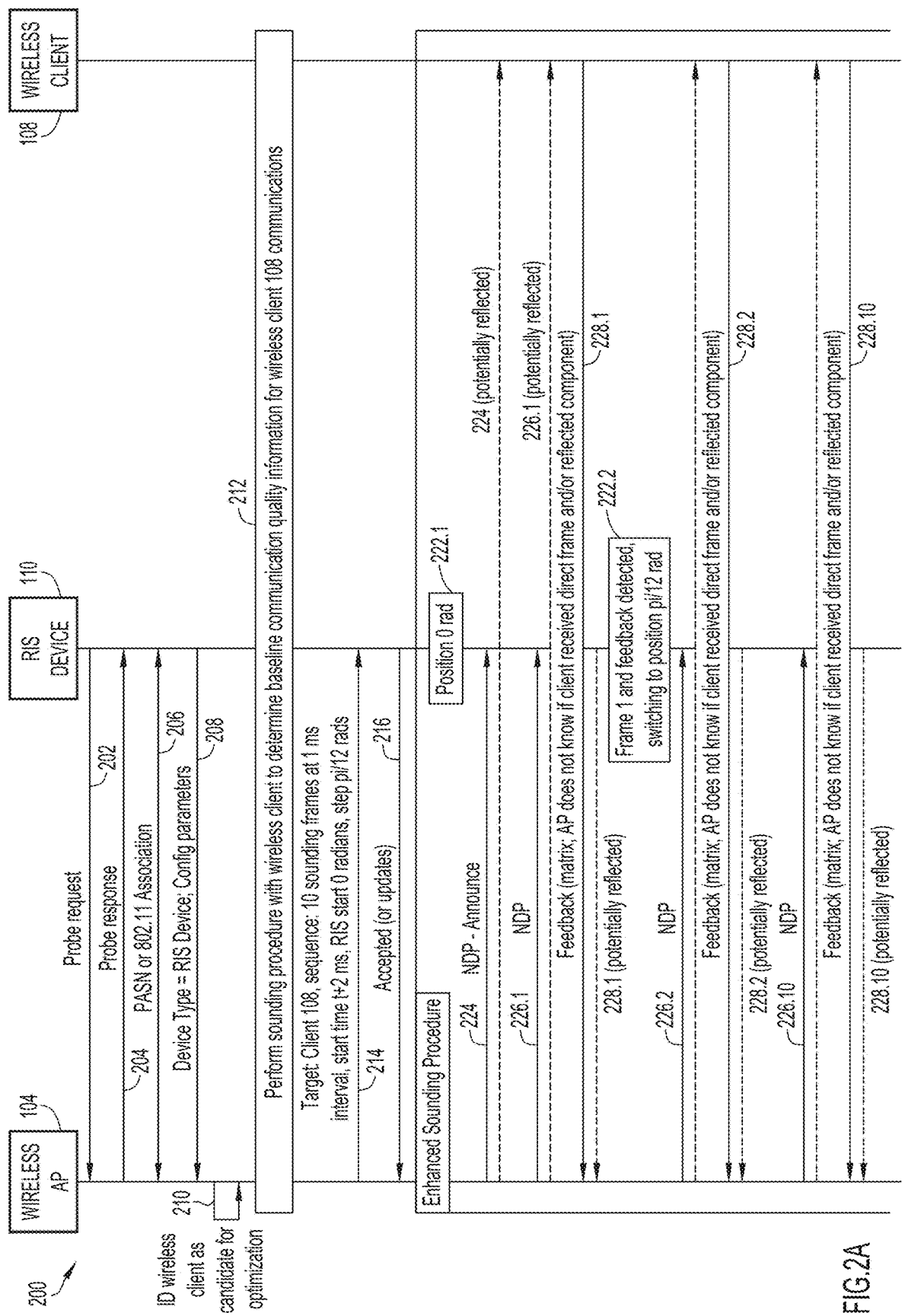
FIGS. 2A and 2B are a message sequence diagram illustrating various operations associated with coordinated steering techniques that may be utilized to facilitate WLAN optimizations, according to an example embodiment.
Figure 2B:
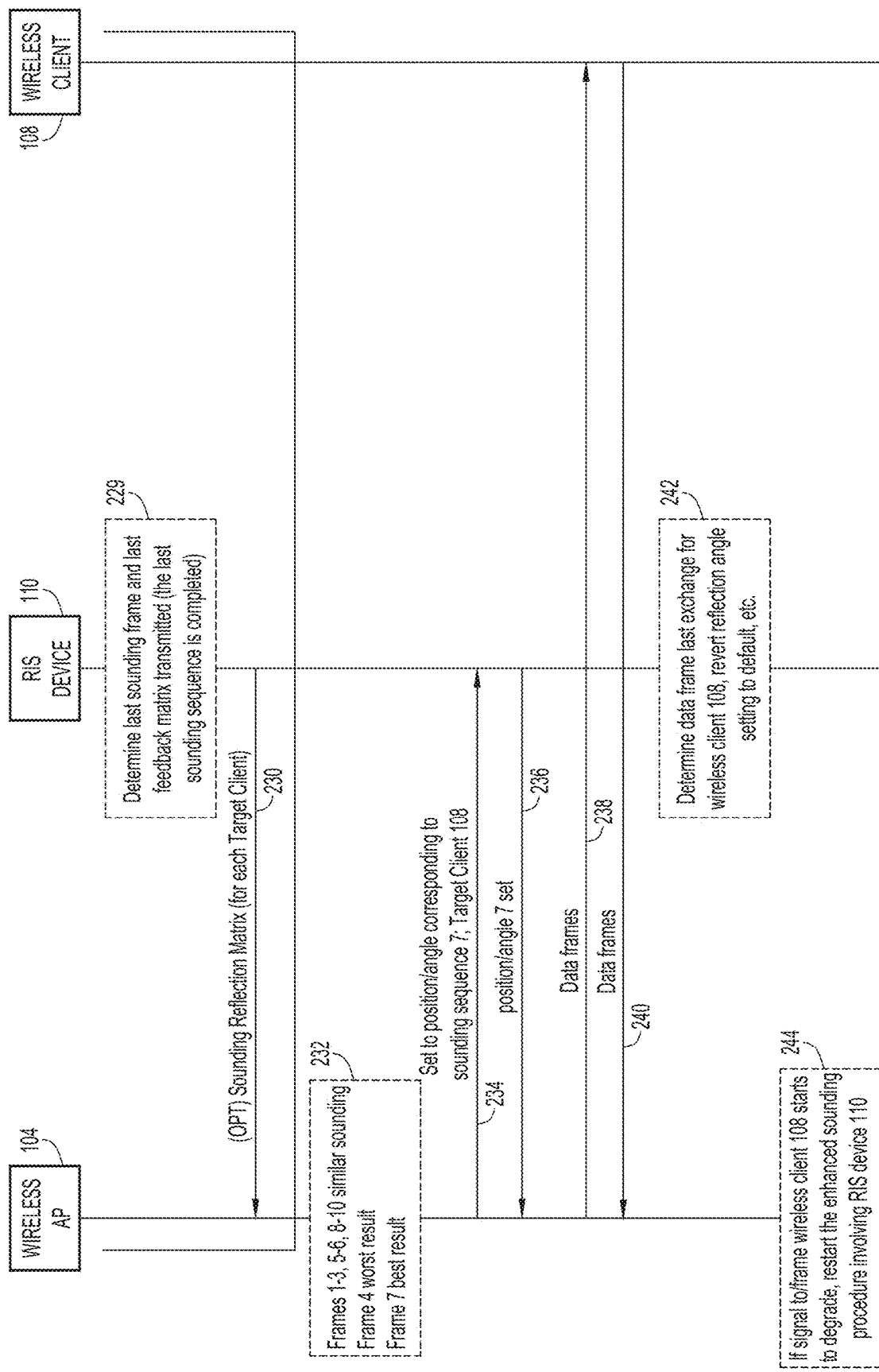

Consider an operational example discussed with reference to FIGS. 2A and 2B through which the coordinated steering techniques may be provided utilizing wireless AP 104 and RIS device 110 in order to facilitate WLAN 120 optimizations in accordance with various embodiments herein. FIGS. 2A and 2B are a message sequence diagram illustrating example operations 200 associated with coordinated steering techniques that may be utilized to facilitate WLAN 120 optimizations and includes wireless AP 104, RIS device 110, and wireless client 108.

Although not shown in FIGS. 2A and 2B, it is to be understood that wireless client 108 is attached/associated with wireless AP 104 prior to operations 200 discussed with reference to FIGS. 2A and 2B being performed.

As discussed above, RIS device 110 can be considered attached to or otherwise interfacing with (e.g., via an 802.11 association) wireless AP 104 via a wired or wireless client that can be provided any configuration of communication I/O 116 such that wireless AP 104 can, via RIS management logic 106, manage/control RIS device 110 to facilitate optimal steering of configurable reflecting elements 112 in order to provide improved wireless communications between wireless AP and one or more wireless clients, such as wireless client 108.

Thus, for embodiments in which RIS device 110 is capable of wireless communications with wireless AP 104, upon initialization of the RIS device 110, a probe request can be initiated by RIS device 110, as shown at 202, which can trigger a probe response being transmitted by wireless AP 104, as shown at 204, which may trigger additional operations, as discussed below. Other communications between wireless AP 104 and RIS device 110 could trigger further communications, such as, for example, any unassociated frame communication(s), such as an Access Network Query Protocol (ANQP) exchange, a Device Provisioning Protocol (DPP) discovery frame, or the like. In some embodiments, RIS device 110 may perform an 802.11 association with wireless AP 104 in order to enable the wireless AP 104 to manage/control RIS device 110. However, it is to be understood that management/control of RIS device 110 by wireless AP 104 is not strictly dependent on an 802.11 association between performed RIS device 110 and wireless AP 104. In some embodiments, for example, management/control communications between RIS device 110 and wireless AP 104 may be performed after a Pre-Association Security Negotiation (PASN), as provided by 802.11az, such that the RIS device 110 and the wireless AP 104 may communicate via a protected (but unauthenticated) tunnel or channel through which information, such as configuration information, can be exchanged. One advantage of PASN mode communications is that while a wireless client, such as RIS device 110, may only associated with one AP (as per 802.11), there can be a PASN tunnel to each of many APs, allowing the RIS device 110 to be shared among two or more wireless APs. Thus, any combination of 802.11 association and/or PASN exchanges may be performed between RIS device 110 and wireless AP 104 in order to facilitate various operations described herein.

As illustrated at 208, the RIS device 110 can signal the nature/configuration of features provided by or supported by RIS device 110 to wireless AP 104. For example, the RIS device 110 can indicate (via any combination of flag(s), information element(s) (IE(s)), etc.), device type information indicating that the device is an RIS device and corresponding configuration parameters of the RIS device 110, which may include, but not be limited to, the matrix structure of configurable reflecting elements 112 (e.g., M rows by N columns), rotation angle granularity of the configurable reflecting elements 112 (e.g., π/12 radians granularity per angle [denoted herein 'phi' or symbolically as 'φ'] change of the configurable reflecting elements), a current position (current phi values) of configurable reflecting elements 112, reflective capabilities of configurable reflecting elements 112 (e.g., maximum orientation, angle, or reflection), combinations thereof, and/or the like.

The information/parameters signaled to wireless AP 104 at 206 can be included in RIS discovery messages (e.g., specific IE(s) within a probe request) or in an associated or unassociated (but protected, e.g., PASN) exchange with wireless AP 104. In one instance, after PASN, the RIS device 110 could send the information/parameters (e.g., device is an RIS device, with M×N elements, each with 'k' angle granularity, etc.) via a new action frame.

As illustrated at 210, wireless AP 104 can identify one or a set of wireless clients/STAs, such as wireless client 108, as a candidate for improved communications via RIS device 110. Various criterion/criteria may be utilized to perform the identification at 210. For example, in some instances, the wireless AP 104 can identify one or more wireless clients having lower Received Signal Strength Indicator (RSSI) values, in relation to other wireless clients served by the wireless AP 104, as candidate(s) for communication improvements. In another example, the wireless AP can identify one or more wireless clients having an unstable channel or channel state information (CSI) indicating a poor communication channel, in relation to other wireless clients served by the wireless AP 104, as candidate(s) for communication improvements. In yet another example, the wireless AP 104 can identify one or more wireless clients having a low Modulation and Coding Scheme (MCS) value, in relation to other wireless clients served by the wireless AP 104, as candidate(s) for communication improvements. Thus, any criteria or combination of thereof may be utilized to identify one or more wireless client(s) for communication optimizations that may be provided via a given RIS device.

Upon identifying a given wireless client for communication optimizations, such as wireless client 108, wireless AP 104 can initiate a sounding procedure with wireless client 108, as shown at 212, in which the sounding procedure performed at 212 can either exclude control of (the configurable reflecting elements 112 of) RIS device 110 by wireless AP 104 or can control the RIS device 110 to change the angle of the configurable reflecting elements 112 once or twice, such that the wireless AP 104 can determine a baseline for communication quality (e.g., any combination signal strength, MCS value, CSI/channel information, etc.) between wireless AP 104 and wireless client 108. For example, the wireless AP 104 can control the RIS device 110 to changes its angle to one or two default angle(s) and, if the wireless AP 104 does not observe significant difference in the wireless client's 108 response, the wireless AP 104 can determine that the RIS is not adding constructive or destructive interference to the wireless client 108 at the default angles; thus providing a baseline for communication quality for the wireless client 108. The sounding procedure can be performed in accordance with 802.11 standards-based procedures through which one or more sounding frames including various tones can be transmitted from wireless AP 104 to wireless client 108, which triggers wireless client 108 to analyze/determine various signal/channel quality information for the tones and transmit a feedback matrix to wireless AP 104 through which wireless AP 104 can also determine various signal/channel quality information for communications with wireless client 108. In some embodiments, the operations at 212 may be optional.

Regarding the feedback matrix for the sounding procedure, consider that the wireless AP 104 sends a frame with some signal on each tone/subcarrier to the wireless client 108, which can receive the frame, possibly on multiple antennas/radio chains. Per standards-based sounding procedures, the wireless client 108 can then return to the wireless AP 104 a feedback matrix that contains, for each radio reception (Rx) chain, the angle at which each tone was received. Thus, the feedback matrix can include one row for each tone, one column for each radio Rx chain, and an angle value. The wireless client 108 can also send the wireless AP 104 a second (global rotation) matrix that can include additional values representing a global rotation value, which can indicate to the wireless AP 104 a global rotation or orientation of the antennas of the wireless client (e.g., antennas are overall oriented X degrees left of the wireless AP), such that within that rotation/orientation reference, each tone at each Rx chain represented via the feedback matrix can be analyzed by the wireless AP 104.

Upon determining the baseline communication quality information for wireless client 108 that excludes control of RIS device 110, the wireless AP 104 can initiate an enhanced sounding procedure through which different reflection angles can be configured for configurable reflecting elements 112 of RIS device 110 through a plurality of sounding sequences in order for wireless AP 104 to determine whether any communication quality improvements can be provided by RIS device 110 for communications between wireless AP 104 and wireless client 108.

As shown at 214, wireless AP 104 can transmit a sounding warning frame to the RIS device 110 that includes sounding parameters/information for the enhanced sounding procedure that is to be performed by the wireless AP 104. In various embodiments the sounding parameters/information included in the sounding warning frame may include, but not be limited to: sounding sequence parameters/information, such as a number of sounding frames to be transmitted by the wireless AP; an intended interval between the sounding frame transmissions; a desired rotation angle factor or step and direction (represented by a positive (e.g., counterclockwise) or negative (e.g., clockwise) angle value, e.g., π/12 radians or −π/12 radians) that is to be adjusted for the configurable reflecting elements 112 for each successive sounding frame transmission; sounding type information (e.g., training frames that return a matrix (for High Throughput (HT), Very High Throughput (VHT), or Television VHT (TVHT), which can be expressed as designed for calibration or channel quality assessment and can be associated with different structures (e.g., number of tones or length of the sounding frame, header structure, etc.)); timing or index information, such as a start time for the enhanced sounding procedure (e.g., an absolute time or time offset relative to the time at which the sounding warning frame is received by the RIS device 110); target wireless client(s) to be involved in the enhanced sounding procedure (e.g., each identified via a Media Access Control (MAC) address, Internet Protocol (IP) address, or any other non-MAC or non-IP address identifiers (permanent/stable or non-permanent/non-stable (e.g., may be rotated/changed)), that may be used to identify target client(s)); a likely preferred angle position or a starting angle position for the configurable reflecting elements 112; combinations thereof; and/or the like.

For example, as shown at 214, wireless AP 104 can signal to RIS device 110, at a time 't', that wireless client 108 is to be involved in the enhanced sounding procedure, that the procedure is to involve 10 sounding frames transmitted at 1 millisecond (ms) intervals, that the procedure is to begin at a start time of 't'+2 ms, that the RIS device 110 is to start with the angles of the configurable reflecting elements 112 set to 0 radians and is to increase the angle of the configurable reflecting elements 112 by $\pi/12$ radians per sounding frame transmission. It is to be understood that other angle steps can be used.

As shown at 216, RIS device 110 can respond to wireless AP 104 and indicate that RIS device 110 accepts the sounding parameters received from the wireless AP 104 or can indicate updates to the sounding parameters. In some instances, RIS device 110 may indicate a different sounding sequence parameters than those sent from wireless AP 104. For example, in some embodiments, RIS device 110 may be statically configured (e.g., by a manufacturer) to only rotate configurable reflecting elements 112 by a fixed angle, such as $\pi/16$ radians, at each iteration. RIS device 110 could signal such information to wireless AP 104 at 216. Other variations for sounding parameter updates can be envisioned.

Thereafter, the enhanced sounding procedure can be performed, as shown at 220, in which RIS device 110, via element control logic 114, sets the reflection angle of the configurable reflecting elements 112 to the starting angle position (0 radians, in this example), as shown at 221.1.

As shown at 224, wireless AP 104 transmits a Null Data Packet (NDP) announcement (NDP-A) frame, per standards-based procedures, to signal initiation of the enhanced sounding procedure. The NDP-A frame transmission at 224 can potentially be reflected by the RIS device 110 toward wireless client 108 depending on whether the current position of the configurable reflecting elements 112 are directing the transmission toward wireless client 108 or the NDP-A frame can be received directly by the wireless client 108 if the current position of the configurable reflecting elements 112 are not directing the transmission toward wireless client 108.

Thereafter, a series of sounding sequences may be performed in which, for a first sounding sequence of the ten sounding sequences to be performed (e.g., ten sounding frames were indicated by the wireless AP 104 as being involved in the enhanced sounding procedure), the first sounding frame for the enhanced sounding procedure is transmitted by wireless AP 104 via an NDP frame transmission (including sounding tones), as shown at 226.1. The NDP frame transmission at 226.1 can potentially be reflected by the RIS device 110 toward wireless client 108 depending on whether the current position of the configurable reflecting elements 112 are directing the transmission toward wireless client 108 or the NDP frame can be received directly by the wireless client 108 if the current position of the configurable reflecting elements 112 are not directing the transmission toward wireless client 108. The NDP frame transmitted at 226.1 includes identifying information (e.g., MAC address) for the wireless client 108 such that RIS device 110, via communications I/O 116 (which is configured to operate in accordance with 802.11 standards, as discussed herein) can identify that the first sounding frame from wireless AP 104 has been transmitted.

It is noted for the enhanced sounding procedure, the wireless AP 104 does not know if the wireless client 108 receives the sounding frames directly from the wireless AP 104 or as reflected by the RIS device 110.

At 228.1, per standards-based sounding operations, the wireless client 108 transmits a corresponding feedback matrix calculated for the sounding tones received in the NDP transmission (direct or reflected). Similar to transmissions from wireless AP 104 toward wireless client 108, the feedback matrix transmitted by wireless client 108 can potentially be reflected back to the wireless AP 104 via RIS device or can be received directly from the wireless client 108.

The feedback matrix transmitted at 228.1 includes identifying information (e.g., MAC address) for the wireless client 108 such that RIS device 110 can identify that both the first sounding frame from wireless AP 104 has been transmitted and that the wireless client 108 has transmitted its first feedback matrix to the wireless AP 104 in response to the first sounding frame. The exchange of a sounding frame transmission being sent from the wireless AP 104 to a wireless client and the wireless client transmitting a feedback matrix to the wireless AP 104 can represent the completion of a given sounding sequence or cycle.

In at least one embodiment, upon detecting a sounding exchange involving both a sounding frame transmission and a feedback matrix transmission being performed, which indicates that a particular sounding sequence has been completed, the RIS device 110 can (if multiple sounding frames are to be sent for the enhanced sounding procedure) update/rotate the reflection angle of the configurable reflecting elements 112 by a configurable rotation angle factor or step and direction (e.g., represented by an angle value), as shown at 222.2, which could be the angle factor and direction as expressed by the wireless AP 104 via the sounding warning frame transmitted at 214 or could be a statically configured fixed angle for the RIS device 110.

However, updating/rotating the angle of configurable reflecting elements 112 by the RIS device 110 is not dependent on the RIS device 110 detecting that both a sounding frame transmission and a feedback matrix transmission have been performed. For example, if the RIS device 110 knows the intended interval between sounding frame transmissions and knows the start time for the enhanced sounding procedure, the RIS device 110 could automatically update/rotate configurable reflecting elements 112 based on the interval (e.g., every 1 ms) such that the RIS device 110 could determine that a sounding sequence or cycle is expected to be completed at every interval.

It is noted that the operations illustrated for FIGS. 2A and 2B are shown for only one wireless client, wireless client 108. However, it is to be understood that for sounding involving multiple wireless clients, the wireless AP 104 could transmit multiple sounding frames at 228.1, one sounding frame transmission for each wireless client that is intended for the enhanced sounding procedure, and each client could transmit a corresponding feedback matrix in response to their corresponding sounding frame transmission. In such instances, determining the end of a particular sounding sequence or cycle could include determining that each sounding frame transmission and each feedback matrix transmission for each wireless client had been completed for the particular sounding sequence or cycle.

The enhanced sounding procedure operations can be continued in a similar manner, as shown 226.2 and 228.2 thru 226.10 and 228.10, e.g., for ten sounding sequences or cycles, until all sounding frame sequences or cycles that the AP announced in 214 have been performed (e.g., all sounding frames have been transmitted by wireless AP 104 and all feedback matrices have been received by wireless AP 104).

Continuing to FIG. 2B, as shown at 229, the RIS device 110 can determine when the last sounding frame has been transmitted for the enhanced sounding procedure (based on the sounding sequence parameters/information received at 214 indicating the number of sounding frames) and the last feedback matrix has been transmitted by the wireless client 108, thereby determining that the last sounding sequence or cycle has been completed. In at least one embodiment, upon determining that the last sounding sequence or cycle has been completed, the RIS device 110 can optionally transmit a sounding reflection matrix to the wireless AP 104, as shown at 230, that includes each NDP frame sequence index and the angle at which the configurable reflecting elements 112 of the RIS device 110 were set for each sounding sequence or cycle (e.g., index 1, 0; index 2, $\pi/12$; index 3, $2\pi/12$ or $\pi/6$; index 4, $3\pi/12$ or $\pi/4$, etc.). In some embodiments, the RIS device 110 could transmit a sounding reflection matrix to the wireless AP at the end of each sounding sequence or cycle. In some embodiments, other parameters/ parameters information could be included in a sounding reflection matrix, such as identifying information (e.g., MAC address(es)) for feedback matrix responders (e.g., the wireless target client(s)) that were detected by the RIS device 110.

However, as noted above, transmission of one or more sounding reflection matrices by RIS device 110 is an optional feature. As discussed at 214, since the wireless AP 104 can transmit sounding sequence parameters/information to the RIS device 110, information included in one or more sounding reflection matrices may not be needed by the wireless AP 104.

Continuing to 232, the wireless AP 104 can analyze/ compare each feedback matrix received for each sounding sequence for wireless client 108 in order to determine a particular sounding sequence or cycle and corresponding reflection angle of the configurable reflecting elements 112 of the RIS device 110 that yielded the highest signal/channel quality (e.g., highest signal gain) compared to other sounding sequences/cycles, for example, the matrix that displayed the largest conformity with the signal sent by the wireless AP 104 for a given sounding cycle. In one embodiment, the comparison at 232 can involve a comparison to the results received for the baseline sounding procedure performed with the wireless client 108 at 212.

For example, consider that the wireless AP 104 sends each tone at a specific power and angle (relative to a neighboring tone). In an ideal scenario, the wireless client 108 should receive them at the same relative angle (except that multipath interference can impact the reception). The second matrix (the global rotation matrix) received by the wireless AP 104 can be multiplied with the first (feedback) matrix received by the wireless AP 104, in order to determine an indication of the amplitude at which the tones were received. In one example, the feedback matrix with the highest multiplied result can indicate the highest gain to the wireless client 108 for a corresponding sounding cycle, such that the wireless AP 104 can determine that the wireless client 108 may receive the strongest signal at the position of the configurable reflecting elements 112 of the RIS device 110 for the corresponding cycle, which represents the best likely RIS position for the wireless client.

In this example, consider that wireless AP 104 determines at 232 that sounding frames (sequences/cycles) 1, 2, 3, 5, 6, 8, 9, and 10 yielded similar sounding results for wireless client 108, that sounding frame 4 yielded the worst result (e.g., decreased signal/channel quality compared to the baseline results), and that sounding frame 7 yielded the best result. As such, the wireless AP 104 can identify that the optimal reflection angle setting for the configurable reflecting elements 112 of RIS device would correspond to the reflection angle setting for sounding sequence index number 7.

As shown at 234, when the wireless AP 104 intends to initiate a data exchange with the wireless client 108 (e.g., either a downlink (DL) stream (data frame(s) that the client wants to send to the AP) or a trigger for an uplink (UL) (or upstream)scheduled transmission (frame(s) sent from the AP to the client)), the wireless AP 104 can precede its transmission with a frame transmission to the RIS device 110 (e.g., a management frame of type action (an action frame) or a data frame with the configuration included as the payload), or potentially a wire-based communication to the RIS device 110 if interfacing with the RIS device via a wired connection, that indicates the number of frames expected to be exchanged (uplink and downlink) with the wireless client 108 (e.g., [target: wireless client 108 (potentially, target MAC of the client); number of frames]) and the preferred reflection angle setting for the configurable reflecting elements 112 of RIS device 110. In one embodiment, a preferred reflection angle setting could identify a specific reflection angle setting (e.g., $6\pi/12$ or $\pi/2$). However, in another embodiment, a preferred reflection angle setting could simply identify a sequence index value (e.g., index=7) or other sounding timing information such that the RIS device 110 could identify the corresponding reflection angle setting that was used for a particular sounding sequence or cycle (e.g., sequence index 7). The RIS device can confirm the reflection angle setting to the wireless AP, as shown at 236.

Thereafter, as shown at 238 and 240, data frames can be exchanged between the wireless AP 104 and wireless client 108 in which the data frame transmissions would be reflected via configurable reflecting elements 112 of RIS device 110. In at least one embodiment, as shown at 242, upon determining the last data frame exchange between wireless AP 104 and wireless client 108, the RIS device 110 can revert the reflection angle setting of the configurable reflecting elements 112 to a default value, or some other value that could be configured for the RIS device 110.

Further, as shown at 244, the wireless AP 104 can monitor the movement and signal/channel quality for communications involving wireless client 108 and, if the signal/channel quality starts to degrade, the wireless AP 104 can restart an enhanced sounding procedure (e.g., as shown at 220) involving RIS device 110 to determine whether a reflection angle update may be needed for the configurable reflecting elements 112.

In some embodiments, assuming historical reflecting angle setting information for a given coverage area covered by wireless AP 104 is available (e.g., stored by wireless AP 104 and/or WLC 102), wireless AP 104 could track the movement of wireless client 108 and automatically update reflection angle settings for the configurable reflecting elements 112 of RIS device 110 as the wireless client 108 moves throughout the coverage area for wireless AP in order to angle the reflective energy transmitted by wireless AP 104 toward wireless client 108, ensuring the wireless client is within RF reach.

Figure 3:
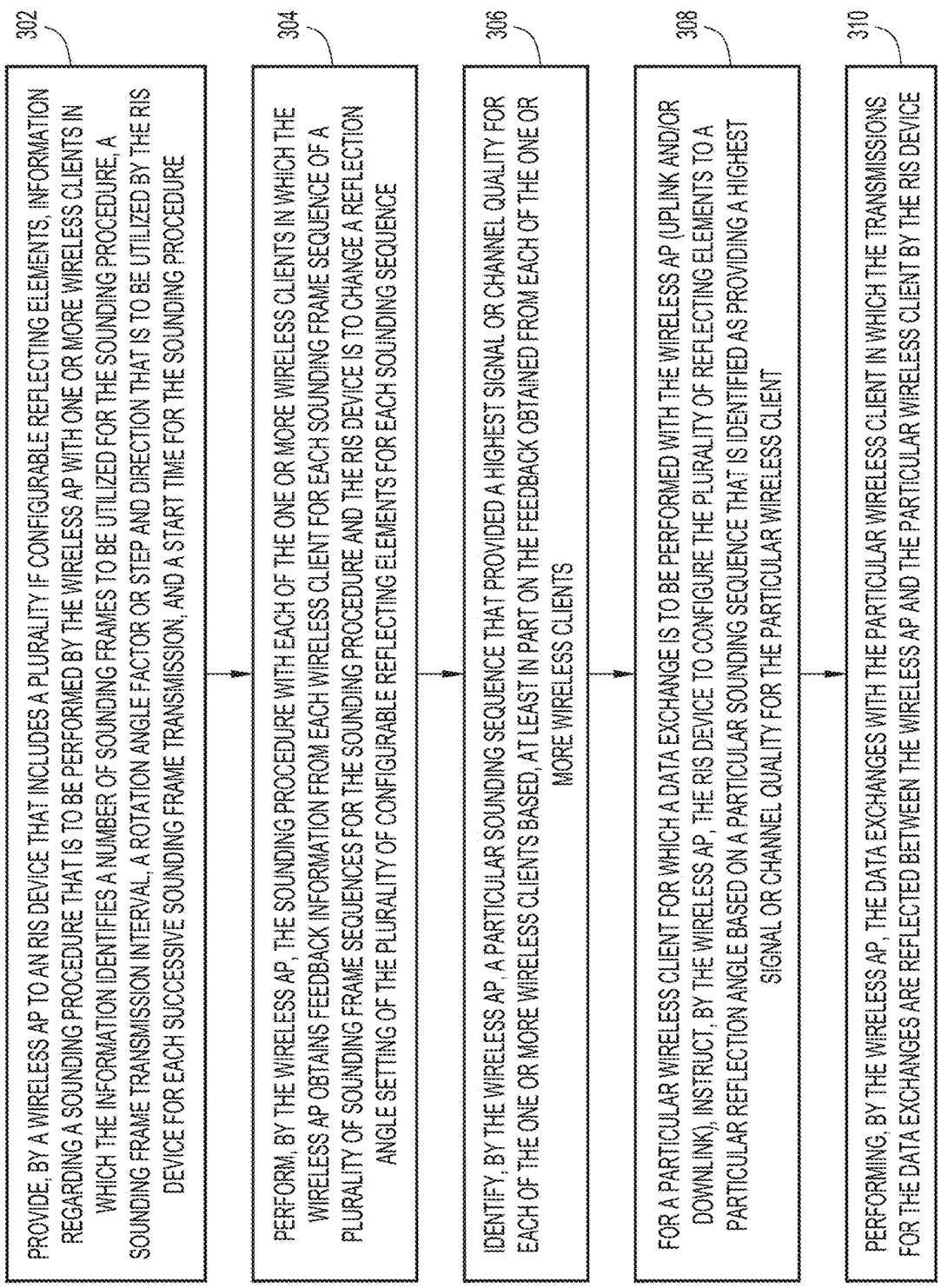
FIG. 3 is a flow chart depicting a method according to an example embodiment.

Referring to FIG. 3. FIG. 3 is a flow chart depicting a method 300 according to an example embodiment. In at least one embodiment, method 300 may be associated with techniques that may be utilized to facilitate coordinated steering of one or more RIS devices, which may be performed by at least in part by a wireless AP, such as wireless AP 104, and/or by an RIS device, such as RIS device 110, as illustrated in FIG. 1.

At 302, the method may include providing, by a wireless AP to an RIS device that includes a plurality of configurable reflecting elements, information regarding a sounding procedure that is to be performed by the wireless AP with one or more wireless clients in which the information identifies a number of sounding frames to be utilized for the sounding procedure, a sounding frame transmission interval (e.g., every 1 ms), a rotation angle factor or step and direction (e.g., positive or negative) that is to be utilized by the RIS device for each successive sounding frame transmission, and a start time for the sounding procedure. In one embodiment, the information may further identify one or more target wireless client(s) that are to be involved in the sounding procedure (e.g., MAC address(es), etc.). In one embodiment, the information can be provided to the RIS device via a sounding warning frame transmitted by the wireless AP.

In some embodiments, prior to the operations at 302, the method may include obtaining, by the wireless AP from the RIS device, configuration parameters or information identifying features provided and/or supported by the RIS device, such device type information indicating that the device is an RIS device, a matrix structure or other structure of configurable reflecting elements (e.g., M rows by N columns or other configuration) of the RIS device, the rotation angle granularity (e.g., resolution) of the configurable reflecting elements, current position (current phi values) of the configurable reflecting elements, reflective capabilities of the configurable reflecting elements (e.g., maximum orientation, angle, or reflection), and/or the like. In some embodiments, the configuration parameters/information can be sent by the RIS device after the RIS device performs an 802.11 association with the wireless AP. In some embodiments, the configuration parameters/information can be sent to the wireless AP without the RIS device performing an 802.11 association with the wireless AP. For example, in some embodiments, the RIS device can send the configuration parameters/information via PASN communications with the wireless AP.

At 304, the method may include performing, by the wireless AP, the sounding procedure with each of the one or more wireless clients in which the wireless AP obtains feedback information from each wireless client for each of a sounding sequence (or cycle) of a plurality of sounding sequences (or cycles) for the sounding procedure and the RIS device is to change a reflection angle setting of the plurality of configurable reflecting elements for each sounding sequence.

In at least one embodiment, the method may include the wireless AP obtaining a sounding reflection matrix from the RIS device either for each sounding sequence or at the end of the sounding procedure in which the/each sounding reflection matrix identifies each reflection angle configuration for the plurality of configurable reflecting elements, and potentially identifies a sounding sequence index value. In one embodiment, the RIS device may determine that a particular sounding sequence has completed by detecting both sounding frame transmission(s) from the wireless AP and corresponding feedback matrix transmission from each of the one or wireless clients for a particular sounding sequence or cycle. In one embodiment, the RIS device may determine that a particular sounding sequence has completed based on the sounding frame transmission interval information sent to the RIS device from the wireless AP.

At 306, the method may include identifying, by the wireless AP, a particular sounding sequence (or cycle) that provided a highest signal or channel quality for each of the one or more wireless clients based, at least in part on the feedback obtained from each wireless client. In some embodiments, the determination at 306 may be based additionally on baseline signal or channel quality information obtained by the wireless AP through a baseline sounding procedure that excludes use of the RIS device during the baseline sounding procedure. In various embodiments, a highest signal or channel quality can be determined based on determining a feedback matrix for a corresponding sounding sequence or cycle that is more conformant to the sounding frame transmitted for that corresponding sequence/cycle and/or with the highest amplitude compared to other feedback matrixes for other sounding sequences/cycles.

At 308, the method may include, for a particular wireless client for which a data exchange is to be performed with the wireless AP, instructing, by the wireless AP, the RIS device to configure the plurality of configurable reflecting elements to a particular reflection angle based on the particular sounding sequence that is identified as providing the highest signal or channel quality for the particular wireless client. In at least one embodiment, the instructing may include the wireless AP identifying the particular wireless client to the RIS device (e.g., providing the wireless client's MAC address, etc.), identifying the number of data exchanges that are to be performed between the wireless AP and with particular wireless client, and potentially identifying the type of exchanges to be performed (e.g., uplink and/or downlink).

At 310, the method may include performing, by the wireless AP, the data exchanges with the particular wireless client in which the transmissions for the data exchanges are reflected between the wireless AP and the particular wireless client by the RIS device.

Accordingly, embodiments herein may provide coordinated steering techniques that can be utilized for an RIS device in order to optimize signals transmitted between a wireless AP and one or more wireless client(s) in a WLAN.

Beyond coordinated steering of an RIS device to facilitate optimized communications between a wireless AP and one or more wireless clients in a WLAN, in some embodiments, coordinated steering of an RIS device can be apportioned between multiple wireless APs such that prioritized time-slices for utilizing the RIS device can be determined or assigned to/claimed by the multiple wireless APs. Further, coordinated steering an RIS device by multiple wireless APs through prioritized time-slices can enable enhanced operations for a WLAN, such as facilitating roaming optimizations through which seamless transitions or roaming of wireless client(s) from at least a first (i.e., source) wireless AP to a second (i.e., target) wireless AP can advantageously be provided for the WLAN.

Figure 4:
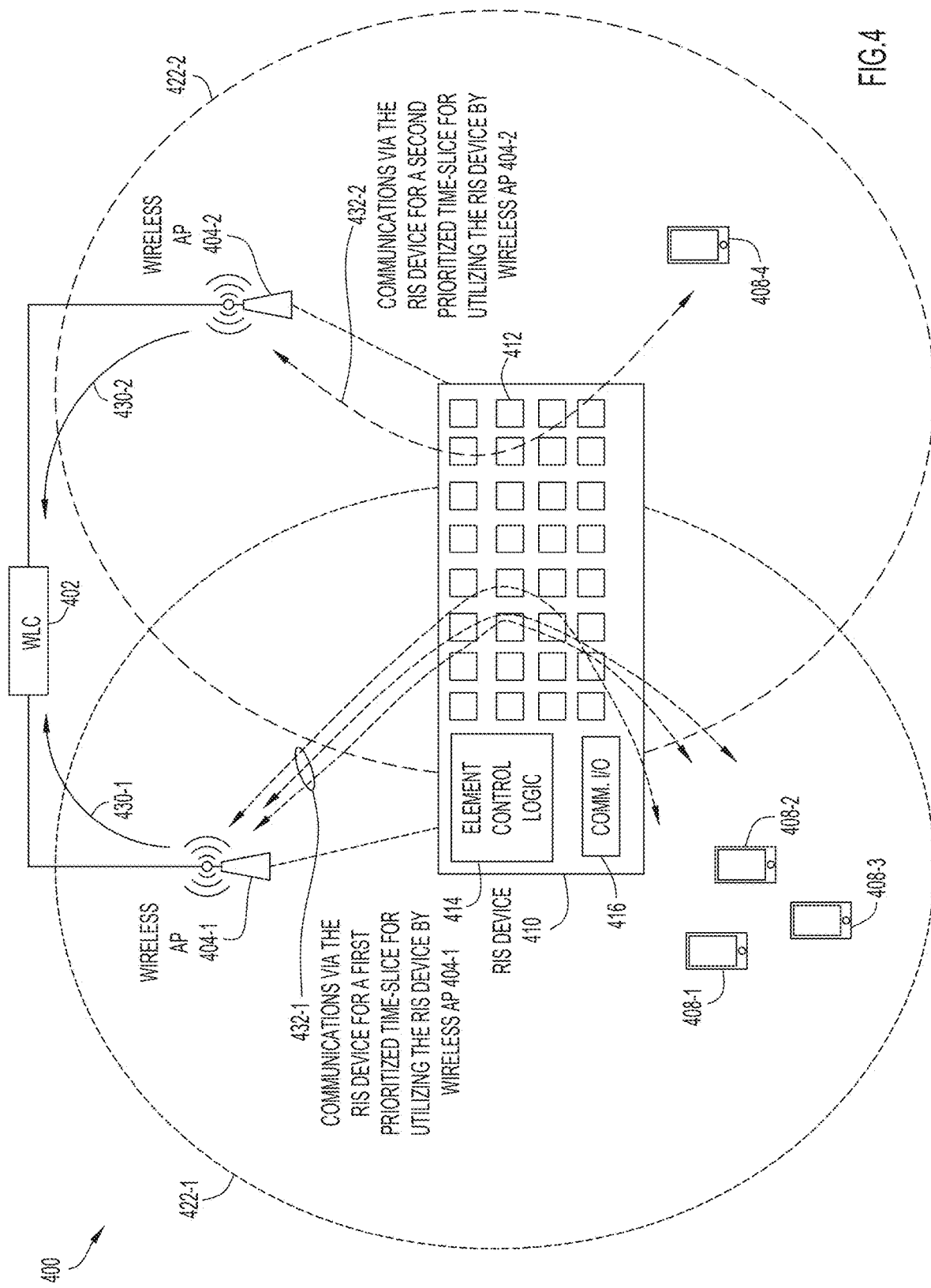
FIG. 4 is a block diagram illustrating of a system associated with providing coordinated steering of an RIS device in a prioritized time-sliced manner between at least two wireless APs in order to optimize communications between the wireless APs and wireless clients served thereby for a WLAN, according to an example embodiment.

As extension of system 100 illustrated in FIG. 1, consider features as illustrated in FIG. 4, which is a block diagram illustrating features of a system 400 associated with providing coordinated steering of an RIS device 410 in a prioritized time-sliced manner between at least two wireless APs 404-1 and 404-2 in order to optimize communications between the wireless APs and wireless clients served thereby for a WLAN, according to an example embodiment. FIG. 4 further includes a WLC 402 and wireless clients 408-1, 408-2, 408-3, and 408-4. RIS device 410 includes configurable reflecting elements 412 and can be configured with any combination of internal/external element control logic 414 and communication I/O 416.

For the embodiment of FIG. 4, consider that wireless AP 404-1 may serve wireless clients 408-1, 408-2, and 408-3 within an RF coverage area 422-1 (sometime referred to as a 'cell') by utilizing one or more first configurations of the configurable reflecting elements 412 of RIS device 410 in order to facilitate RF communications between wireless AP 404-1 and wireless clients 408-1, 408-2, and 408-3. Further, consider that wireless AP 404-2 may serve wireless client 408-4 within an RF coverage area 422-2 by utilizing one or more second configurations of the configurable reflecting elements 412 of RIS device 410 in order to facilitate RF communications between wireless AP 404-2 and wireless client 408-4. Generally, the combination of RF coverage areas 422-1 and 422-2 may represent the WLAN for the embodiment of FIG. 4 and wireless AP 404-1 and 404-2 may be considered neighboring wireless APs, such that their corresponding RF coverage areas may overlap, at least in part, as shown in FIG. 4.

During operation of system 400, RIS device 410 may but is not required to perform an 802.11 association with each wireless AP 404-1 and 404-2. In one embodiment, the RIS device 410 (e.g., via communication I/O 416) may utilize 802.11 Multi-Link Operation (MLO) features in order to establish communication links with both wireless AP 404-1 and 404-2 if the wireless APs 404-1 and 404-2 utilize multiple AP coordination (MAPc) and the RIS device 410, as a single Multi-Link Device (MLD), established a link to the AP MLD represented by radios on each of the two wireless APs 404-1 and 404-2. In another embodiment, the RIS device 410 (e.g., via communication I/O 416) perform an 802.11 association in succession to one of the wireless APs 404-1 or 404-2 and then perform another 802.11 association with the other wireless AP. In yet another embodiment, the RIS device 410 may not perform an 802.11 association with either wireless AP 404-1 or 404-2, but rather may communicate with each wireless AP 404-1 and 404-2 via unassociated link encryption communications (e.g., via PASN communications). In yet another embodiment, one or both wireless AP 404-1 and/or 404-1 may communicate with RIS device 410 (e.g., via communication I/O 416) utilizing wired connections, such as via Ethernet communications.

As an extension of the sounding operations discussed above with reference to FIGS. 2A and 2B, each wireless AP 404-1 and 404-2 may perform corresponding sounding procedure(s) for each wireless client served thereby through both baseline sounding procedure(s) (not utilizing the RIS device 410) and enhanced sounding procedure(s) (utilizing/leveraging the RIS device 410) such that comparisons can be performed, for each wireless client, regarding the signal strength/channel quality of the communications both with and without the RIS device 410 in order to evaluate the gain that can be obtained by using the RIS device 410 (versus direct link communications) by each wireless AP 404-1 and 404-2 for each wireless client served by each wireless AP (e.g., determining whether there is an optimal angle configuration (or potentially different optimal angle configurations) of the configurable reflecting elements 412 of RIS device 410 for communications involving for each wireless client 408-1, 408-2, and 408-3 served by wireless AP 404-1 and determining whether there is an optimal angle configuration of the configurable reflecting elements 412 of RIS device 410 for communications involving wireless client 408-4 served by wireless AP 404-2).

Prior to performing the sounding procedures, it is to be understood that each wireless AP 404-1 and 404-2 can perform exchanges with RIS device 410, as discussed above at 202-208, in order to identify to WLC 402 and/or, potentially each other (e.g., in a controller-less scenario), that each wireless AP 404-1 and 404-2 can communicate with/provided coordinated steering for RIS device 410. Thus, WLC 402 and each wireless AP 404-1 and 404-2 can identify that the particular RIS device 410 may be chosen for enhancing communications with wireless clients served by the neighboring wireless APs 404-1 and 404-2.

Any technique as would be understood by a person of ordinary skill in the art may be utilized (e.g., using standards-defined techniques/methods) to determine or quantify the gain that may be achieved by using the RIS device 410 for communications with each wireless client versus direct link communications with each wireless client, so long as the technique utilized to determine/quantify the gain is the same for neighboring wireless APs (of a same or different vendor).

In at least one embodiment, a per-client decibel (dB) gain that can be realized for communications between each wireless AP and each wireless client by utilizing the RIS device 410 (for potentially different configurations of the configurable reflecting elements 412 of the RIS device 410 for different wireless client(s)) may be considered in one instance. In at least one embodiment, the gain may reflect worst/better off wireless clients served by an AP. In at least one embodiment, the gain may be represented as a composite metric or a sorted list of gains for a series of clients served by an AP. Any combination of such gains and/or other gains may be determined for wireless clients served by wireless APs in accordance with embodiments herein.

In one embodiment following the sounding procedures being performed by each wireless AP 404-1 and 404-2, each wireless AP can report the gain that may be obtained for each wireless client served thereby to the WLC 402, for example, as shown at 430-1 for wireless AP 404-1 and at 430-2 for wireless AP 404-2. However, for controller-less implementations, each neighboring wireless AP 404-1 and 404-2 may report gains to each other, either over distribution system (DS) communications (e.g., over the wire) or, in some embodiments, can report gains to the RIS device 410 by using a unique/novel protected action frame transmission.

Based on the reported comparative gains, the wireless APs 404-1 and 404-2 can claim or be assigned prioritized time-slices for utilizing or controlling the RIS device 410 by each wireless AP 404-1 and 404-2. Thus, coordination for utilizing the same RIS device 410 by different wireless AP 404-1 and 404-2 through the claiming/assignment of prioritized time-slices can be provided in accordance with embodiments herein such that each wireless AP 404-1 and 404-2 can provided coordinated steering of (potentially different) configurations of the configurable reflecting elements 412 of the RIS device 410 for each of a corresponding prioritized time-slice that each wireless AP 404-1 and 404-2 is assigned or claims for utilizing the RIS device 410.

The priority or precedence for utilizing the RIS device 410 by each of wireless AP 404-1 and 404-2 can be assigned/determined or claimed utilizing any appropriate technique based on the reported gains for each wireless AP. In some instances, a given wireless AP may be provided a higher priority (i.e., a larger time slice/larger period of time) for utilizing the RIS device 410 based on serving a higher number of wireless clients as compared to neighboring wireless AP(s). For example, as shown in FIG. 4, wireless AP 404-1 is serving three wireless clients (408-1, 408-2, and 408-3) as compared to the one wireless client (408-4) served by wireless AP 404-2 such that the overall comparative gain realized by wireless AP 404-1 may be higher than the gain realized by wireless AP 404-2. In still some instances, a given wireless AP may be provided a higher priority based on having a higher number of wireless clients at the edge of the cell/coverage area of the wireless AP, which could be determined based on the individual RSSI of each wireless client (e.g., a count of the top 'n' clients having an RSSI below a given RSSI threshold (meaning they are further from the AP/at the edge of the cell)).

In some instances, it may be determined that the gain that can be realized for each wireless client served by wireless AP 404-1 via coordinated steering of the RIS device 410 may be higher than the gain that can be realized for each wireless client served by wireless AP 404-2 via coordinated steering of the RIS device 410 such that wireless AP 404-1 can be assigned or claim a first, higher priority time-slice for utilizing the RIS device 410 than a second, lower priority time slice that could be assigned to or claimed by wireless AP 404-2 for utilizing the RIS device 410. In still some instances, it may be determined that a larger number of wireless clients served by wireless AP 404-1 may realize gains through coordinated steering of RIS device 410 by wireless AP 404-1 as compared to a lower number of wireless clients served by wireless AP 404-2 that may realize gains through coordinated steering of RIS device 410 by wireless AP 404-2 such that wireless AP 404-1 can be assigned or claim a first, higher priority time-slice for utilizing the RIS device 410 than a second, lower priority time slice that could be assigned to or claimed by wireless AP 404-2 for utilizing the RIS device 410. In still some instances, for example in a controller-less scenario, each wireless AP 404-1 and 404-2 may receive gains from the other wireless AP, compare the received gains with their own gains, and attempt to claim a prioritized time-slice for communications. The claimed time-slice can be communicated to the other AP, which may confirm the claimed time-slice or propose a different time-slice, such that the wireless APs can negotiate with each other to until agreed upon prioritized time-slices are determined for each wireless AP. Other variations for determining priority for time-slices assigned to or claimed by various wireless APs for a WLAN can be envisioned.

In one embodiment, a precedence value or percentage in relation to time-based utilization of the RIS device 410 may be provided for each wireless AP 404-1 and 404-2 (e.g., precedence: wireless AP 404-1(75%), wireless AP(25%)) such that each wireless AP 404-1 and 404-2 can utilize the RIS device 410 for an amount/period of time that is proportionate to the precedence percentage assigned to/determined for or claimed by each wireless AP. Thus, the precedence percentage may be representative of prioritized time-slices for utilizing the RIS device 410 by each wireless AP 404-1 and 404-2. In another embodiment, the prioritized time-time slices assigned to/determined for or claimed by for each wireless AP 404-1 and 404-2 may be configured in relation to a time or portion of time in which each wireless AP 404-1 and 404-2 may schedule communications based on the time-slice priority or precedence assigned to/determined for or claimed by each wireless AP 404-1 and 404-2. For example, for each of a corresponding time frame, such as 1 second, wireless AP 404-1 may be assigned the first 750 ms for scheduling/performing communications with wireless clients 408-1, 408-2, and 408-3 via certain configuration(s) of the configurable reflecting elements 412 of RIS device 410 and wireless AP 404-2 may be assigned the remaining 250 ms for scheduling/performing communications with wireless client 408-4.

Thus, as shown in FIG. 4, the wireless AP 404-1 can provide coordinated steering involving a certain configuration or configurations (e.g., a potentially different optimal angle configuration for each wireless client served by wireless AP 404-1) of the configurable reflecting elements 412 of the RIS device 410 for a certain (e.g., first) prioritized time-slice that has been assigned to/determined for or claimed by the wireless AP 404-1 for communications that are to be performed between the wireless AP 404-1 and wireless clients 408-1, 408-2, and 408-3, as generally illustrated at 432-1. Similarly, wireless AP 404-2 can provide coordinated steering involving another certain configuration or configurations of the configurable reflecting elements 412 of RIS device 410 for another (e.g., second) prioritized time-slice that has been assigned/determined for or claimed by the wireless AP 404-2 for communications that are to be performed between the wireless AP 404-2 and wireless client 408-4, as generally illustrated at 432-2. Thus, coordinated steering of the RIS device 410 can be provided in a prioritized time-sliced manner between the at least two wireless APs 404-1 and 404-2 in order to optimize signal transmissions with wireless client(s) for the WLAN In some instances, the wireless APs 404-1 and 404-2 may be synchronized to a common system clock and/or to a synchronization signal provide by WLC 402 to ensure appropriate usage of the RIS device 410 for a given prioritized time-slice assigned or determined for each wireless AP 404-1 and 404-2. In some instances, a WLAN infrastructure element (e.g., a given wireless AP or the WLC 402) may keep/maintain a clock signal and also maintain prioritized time-slice assignments such that the element can send a trigger signal to a given wireless AP (e.g., 'it's your turn now') to trigger the wireless AP to perform transmissions within its assigned time-slice.

For a given prioritized time-slice for utilizing the RIS device 410, each wireless AP 404-1 and 404-2 can, similar to the operations discussed above at 234 of FIG. 2B, utilize a frame transmission to the RIS device 410 (or potentially a wire-based communication to the RIS device 410 if interfacing with the RIS device via a wired connection) that indicates the number of frames expected to be exchanged (uplink and downlink) with each of the one or more wireless client(s) served by each wireless AP (e.g., identified by target MAC address(es)) and the preferred reflection angle setting(s) for the configurable reflecting elements 412 of RIS device 410 such that RIS device 410 can be appropriately configured by each wireless AP 404-1 and 404-2 for corresponding communications associated with each wireless AP.

Figure 5:
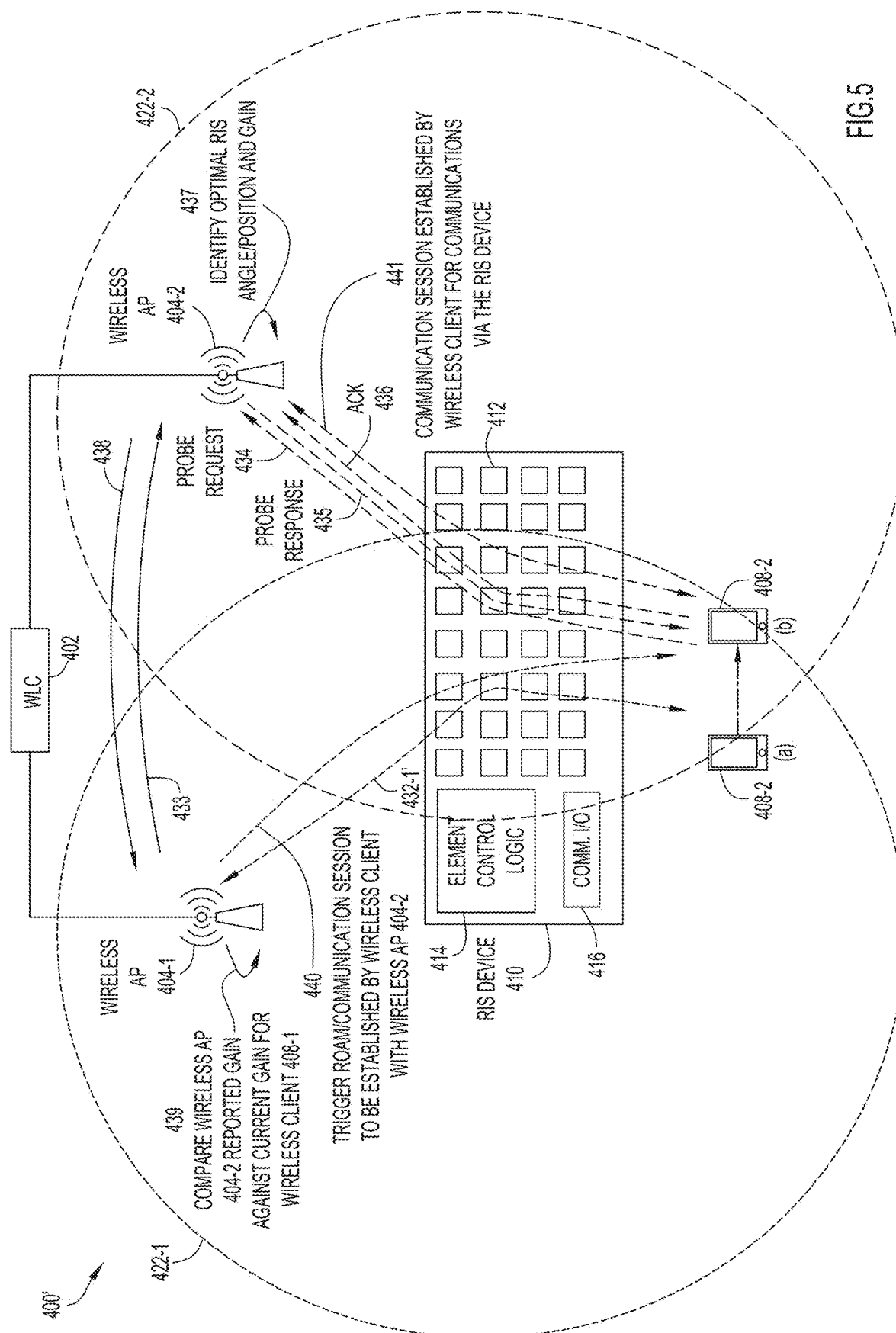
FIG. 5 is a block diagram illustrating features of a system through which coordinated steering of an RIS device may be provided in a prioritized time-sliced manner in order to facilitate seamless roaming for a wireless client within the WLAN, according to an example embodiment.

In accordance with further embodiments herein, coordinated steering of an RIS device by a first wireless AP and a second wireless AP via prioritized time-slices for utilizing the RIS device may provide for the ability to facilitate seamless roaming for a wireless client from a first (i.e., source) wireless AP to a second (i.e., target) wireless AP for wireless client(s) in a WLAN. Referring to FIG. 5, FIG. 5 is a block diagram illustrating features of the system 400' through which coordinated steering of the RIS device 410 of FIG. 4 may be provided in a prioritized time-sliced manner among wireless AP 404-1 and wireless AP 404-2 in order to facilitate seamless roaming for wireless client 408-2 within the WLAN, according to an example embodiment. WLC 402 is also shown in FIG. 4, along with the corresponding RF coverage area 422-1 that may be provided by wireless AP 404-1 and the RF coverage area 422-2 that may be provided by wireless AP 404-2.

For the embodiment of FIG. 5, consider that wireless client 408-2 may be located at the edge of the RF coverage area 422-1 of wireless AP 404-1, as shown at (a), and is benefitting from RIS-based communications for a first communication session with AP 404-1 (e.g., wireless client 408-2 has completed an 802.11 association with wireless AP 404-1 for a first communication session) via RIS device 410, as generally shown via dashed-line 432-1'.

However, as the wireless client 408-2 continues to move away from wireless AP 404-1, as shown at (b), communications with the client may start to degrade (e.g., a lower Modulation and Coding Scheme (MCS) value, typically indexed from 1 to 31, may be used for the communications, resulting in lower throughput for the wireless client, the RSSI for the communications may decrease, etc.). As shown at (b), wireless client 408-2 is moving into the RF coverage area 422-2 provided by wireless AP 404-2.

In one embodiment, the wireless client 408-2 may start scanning other channels looking for other AP(s) with which to perform an 802.11 association for another communications session such that wireless client 408-2 can identify wireless AP 404-2 as a candidate for association. In another embodiment, wireless AP 404-1 or WLC 402 may, based on the RSSI for wireless client 408-2 and the RIS device 410 chosen by wireless AP 404-1 for enhanced communications with the wireless client 408-2 and also chosen by wireless AP 404-2 for enhanced communications with wireless clients served thereby, determine that neighboring wireless AP 404-2 is the most likely next best AP with which wireless client 408-2 should establish another communication session.

In yet another embodiment, the position/location of each RIS for a WLAN, such as the position/location of RIS device 410 for the embodiment of FIG. 5, may be known by the WLC 402 and/or a location server in which the WLC/location server may maintain a map of zones of the WLAN in which the RIS device can provide reflections for each of a given wireless AP in the WLAN. In such an embodiment, the WLC 402 can use such zone mapping information to determine the position of wireless client 408-2 relative to wireless AP 404-1 in order to determine that wireless AP 404-2 is likely the next best wireless AP with which wireless client 408-2 should establish a communication session (e.g., based on a linear projection for the path of wireless client 408-1 for communications involving wireless AP 404-2 from (a) to (b) being directed towards the coverage area of wireless AP 404-2).

In yet another embodiment, the wireless AP 404-1 and/or WLC 402 can maintain historical records indicating the RSSI of probes detected by wireless clients served thereby on neighboring wireless APs, such as probes detected for wireless AP 404-2, when the RIS device 410 is being utilized by wireless AP 404-1. In such an embodiment, wireless AP 404-1 and/or WLC 402 can use such historical records/information to deduce the most likely closest AP to the moving wireless client 408-1, such as wireless AP 404-2 in this example.

Upon identifying (for any appropriate embodiment/combinations thereof), by the wireless AP 404-1 and/or the WLC 402, the next wireless AP with which the wireless client 408-2 should seek to establish another communication session, such as wireless AP 404-2 in this example, the wireless AP 404-1 can communicate (via WLC 402 or via DS communications, in a controller-less scenario, for example) with wireless AP 404-2, as generally illustrated at 433, in order to inform or notify the wireless AP 404-2 regarding an RIS-assisted pre-roam involving wireless client 408-2 (e.g., notifying the wireless AP 404-2 of, among any other information, the MAC of wireless client 408-2 to wireless AP 408-2 and that the wireless AP 404-1 communication session involves the wireless AP 404-1 utilizing the RIS device 410). Wireless AP 404-1 can then instruct the wireless client 408-2 to generate a beacon report for the wireless AP 404-2 channel detected by wireless client 408-2. In some embodiments, the wireless AP 404-1 and/or the WLC 402 may additionally identify to wireless AP 404-2 the configuration, setting, angle/position, and/or other any other indicator/indication regarding the configuration of the configurable reflecting elements 412 of the RIS device 410 that wireless AP 404-1 is currently utilizing for communications with the wireless client 408-2.

In some embodiments, that wireless AP 404-1 and/or WLC 402 may allocate or delegate to wireless AP 404-2 an RIS time-slice (e.g., start time and end time) during which time the wireless AP 404-2 can attempt to determine an optimal configuration of the configurable reflecting elements 412 of the RIS device for a potential communication session that may be established with the wireless client 408-2. In some embodiments, the wireless AP 404-2 can utilize its previously assigned/determined or claimed prioritized timeslice for attempting to determine an optimal configuration of the configurable reflecting elements 412 of the RIS device for a potential communication session that may be established with the wireless client 408-2.

The wireless AP to which a wireless client is expected to roam, such as wireless AP 404-2 in this example, may have a limited number of frames in which to determine the best/optimal configuration of RIS device 410 for communications with wireless client 408-2.

In at least one embodiment, the floor/RF coverage area 422-2 for wireless AP 404-2 and for RF coverage area 422-1 for wireless AP 404-1 may be RF fingerprinted such that wireless AP 404-2 can determine, from the client signal strength on wireless AP 404-1 and the RIS device 410 configuration, the best likely RIS device 410 configuration that may be utilized by wireless AP 404-2 for communications with wireless client 408-2 via the RIS device.

However, for embodiments in which RF fingerprinting is not available, wireless AP 404-2, during its allocated timeslice (e.g., as delegated by wireless AP 404-1 or during its previously determined/allocated/claimed prioritized timeslice for utilizing the RIS device 410), can utilize one or more probe exchange processes through which the wireless AP 404-2 can attempt to determine an optimal configuration of the RIS device 410 for communications with wireless client 408-2.

In one embodiment, wireless AP 404-2 can set/instruct the RIS device 410 (via a sounding warning frame or the like), to a first angle configuration, a targeted number of probe responses to be sent by the wireless AP 404-2 for the probe exchange process, and an angle leap value in response to a single probe request, such as a wireless client 408-2 probe request in this example, generally illustrated at 434. After each probe response sent from the wireless AP 404-2, as generally shown at 435, and determining a corresponding wireless client 408-2 acknowledgement (ACK) frame being sent, as generally shown at 436, the RIS device 410 modifies its angle configuration by the leap value (e.g., first frame reflected at $\pi/3$, second frame reflected at $2\pi/3$, etc.). In this embodiment following one or more probe responses/leap value changes performed by the RIS device 410, the wireless AP 404 can then use an evaluation method (e.g. a Newton-Raphson method) to evaluate which angle configuration, or intermediate angle configuration, is likely to provide the best signal to the wireless client 408-2 (e.g., $\pi/3$, or a position intermediate between $\pi/3$ and $2\pi/3$, such as $\pi/2$).

In another embodiment, wireless AP 404-2 can set/instruct the RIS device 410 (via a sounding warning frame or the like), to a first angle configuration, a targeted number of probe responses to be sent by the wireless AP 404-2 for the probe exchange process, and a Newton-Raphson mode to be utilized by the RIS device 410 to update the configuration of the configurable reflecting element 112 upon detecting wireless client 408-2 transmissions, such as a probe request and probe response ACKs. In this embodiment, consider that that wireless client 408-2 sends a probe request on the wireless AP 408-2 channel, as generally illustrated at 434, which can be detected by the RIS device 410 (via the communications I/O 416), thereby causing the RIS device 410 to update the configuration of the configurable reflecting elements 412 to a second intermediate position (e.g., $\pi/2$ away from the first position). The wireless AP 404-2 can reply with a first probe response, as generally illustrated at 435, and the wireless client can reply with a first ACK, as generally shown at 436, such that the wireless AP 404-2 can determine a gain for both a first and second configuration of the RIS device 410 via each of the probe request sent by the wireless client 408-2 and the first ACK sent by the wireless client 408-2.

After detecting the first ACK being sent from the wireless client 408-2, the RIS device 410 can update its configuration again to a third intermediate position (e.g., $\pi/4$ away from the second position) and the wireless AP 404-2 can send a second probe response, to which the wireless client 408-2 can send a second ACK and the RIS device 410 can again update its configuration to a fourth intermediate position (e.g., $\pi/8$ away from the third position) that can again be ACK'd by the wireless client 408-2 and the probe exchange process can be continued through an 'n' number of probe responses that can be sent by the wireless AP 404-2, either to a single probe request being sent from the wireless client 408-2, or by leveraging an assumption that many wireless clients typically probe more than once on each channel, thus allowing wireless AP 404-2 to spread its responses, and the RIS device its various positions/angles, across more than one probe exchange.

Following the one or more probe exchange processes being performed with the wireless client 408-2, the wireless AP 404-2 can estimate several possible angle/position configurations of the RIS device 410 (i.e., of the configurable reflecting elements 412 of the RIS device 410, potentially evaluated using an NR evaluation method) and the corresponding gain for each configuration when communicating with the wireless client 408-2, as generally illustrated at 437, in order to determine an optimal angle/position configuration of the RIS device 410 and the best gain that can be expected for communications between the wireless AP 404-2 and the wireless client 408-2 for the optimal angle/position configuration of the RIS device 410. Some angle/positions configurations of the RIS device 410 may be constructive (providing an improved/better signal/channel quality), other angle/positions configurations of the RIS device 410 may be destructive (providing a degraded/worse signal/channel quality), while other angle/position configurations of the RIS device 410 may be neutral (different angle positions/configurations resulting in a same/similar signal/channel quality).

As generally illustrated at 438, wireless AP 404-2 can communicate to wireless AP 404-1 (via WLC 402 or via DS communications, in a controller-less scenario, for example) the best gain that can be expected for communications between the wireless AP 404-2 and the wireless client 408-2 for the optimal angle/position configuration of the RIS device 410 as determined by the wireless AP 404-2.

As generally illustrated at 439, wireless AP 404-1 can then compare the gain reported by wireless AP 404-2 against the current gain for communications (432-1') between wireless AP 404-1 and wireless client 408-2. If the wireless AP 404-1 determines that wireless client 408-2 would receive better signal/channel quality conditions through communications with wireless AP 404-2, the wireless AP 404-1 can trigger a roam for the wireless client 408-2 to wireless AP 404-2 for establishing a communication session between the wireless client 408-2 and wireless AP 404-2. Following the triggering, the communication session can be established (e.g., an 802.11 association is performed) between wireless AP 404-2 and wireless client 408-2, as generally shown at 441, in which the wireless AP 404-2 utilizes the previously determined optimal angle/position of the configurable reflecting elements 412 during the (second) prioritized time-slice for utilizing the RIS device 410 by the wireless AP 404-2.

Various techniques may be utilized to trigger the roam for the wireless client 408-2 to wireless AP 404-2. For example, in at least one embodiment, as generally shown at 440, wireless AP 404-1 can trigger the roam of wireless client 408-2 to wireless AP 404-2 using an 802.11v Basic Service Set (BSS) Transition Management (BTM) roaming recommendation that recommends wireless client 408-2 roam to wireless AP 404-2. In another embodiment, wireless AP 404-1 can trigger the roam of wireless client 408-2 to wireless AP 404-2 by progressively degrading the signal strength/channel quality of the communications 432-1' between wireless AP 404-1 and wireless client 408-2 such that the wireless client 408-2 would seek improved communications and thus, seek establishment of the communication session (802.11 association) with the nearest neighboring wireless AP, such as wireless AP 404-2 in this example.

Although not shown in FIG. 5, for scenarios in which a wireless client is near the edge of the coverage area of a given wireless AP such that communications are degrading for the communication session but the communication session with the wireless AP does not involve use of an RIS device by the source wireless AP, similar operations can still be performed as discussed for 433, 434, 435, 436 (if no RF fingerprinting is available), 438, 439, 440, and 441 in order to trigger a roam of the wireless client to a neighboring target wireless AP that could be utilizing an RIS device.

Accordingly, embodiments herein provide various techniques through which coordinated steering of an RIS device can be provided in a prioritized time-sliced manner between at least two wireless APs in order to optimize communications between the wireless APs and wireless client(s) served thereby for a WLAN. Further, embodiments herein may also provide various techniques through which coordinated steering of an RIS device utilizing prioritized time-sliced steering of the RIS device by a first (i.e., source) wireless AP and a second (i.e., target) wireless AP may be utilized in order to facilitate seamless transitions or roaming between the first wireless AP and the second wireless AP for wireless client(s) in a WLAN.

Figure 6:
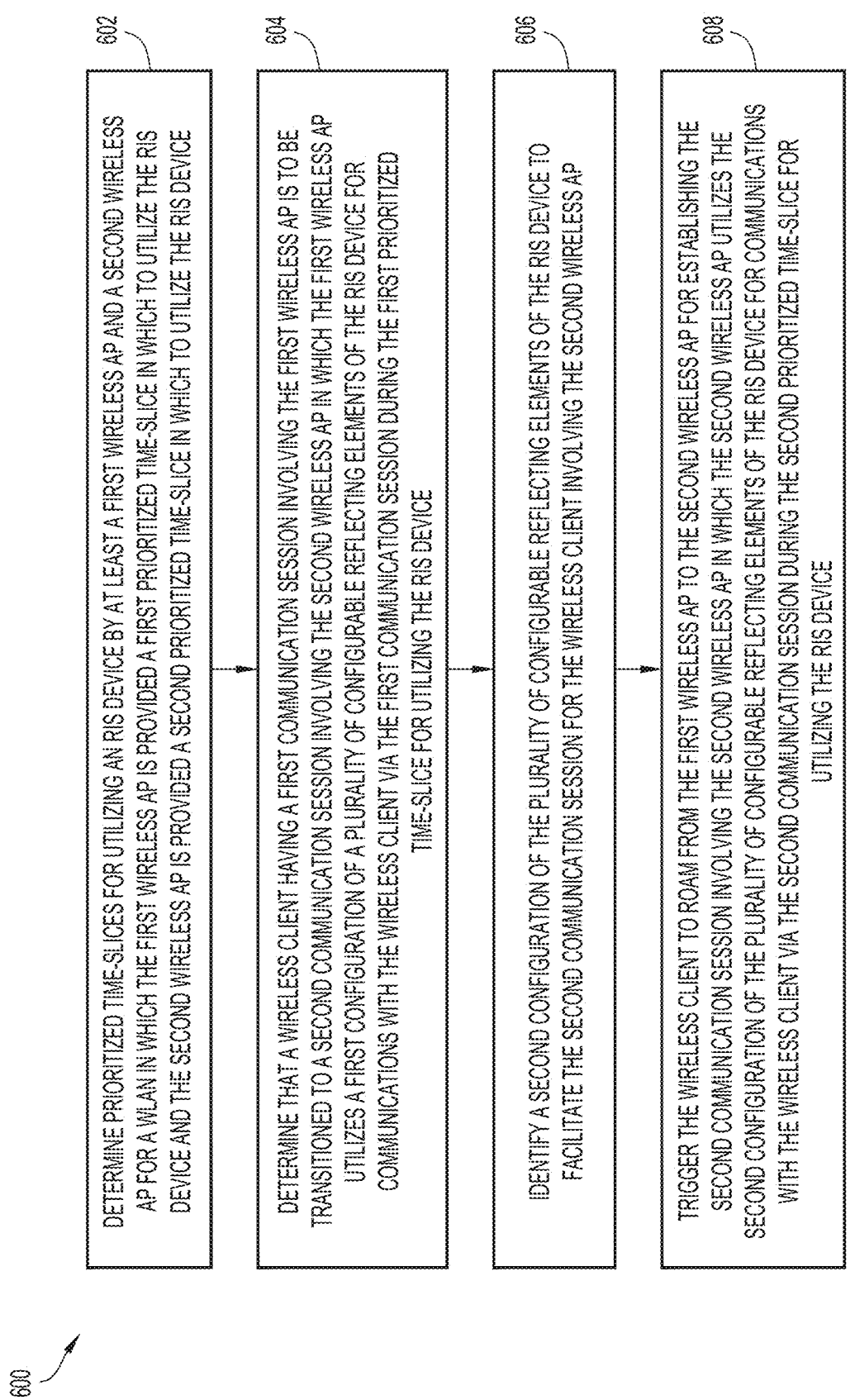
FIG. 6 is a flow chart depicting another method according to an example embodiment.

Referring to FIG. 6, FIG. 6 is a flow chart depicting a method 600 according to an example embodiment. In at least one embodiment, method 600 may be associated with operations that may be utilized to reduce multipath interference in a WLAN, which may be performed by, at least in part, by a WLC, such as WLC 402, and/or a first (i.e., source) wireless AP, such as wireless AP 404-1 and a second (i.e., target) wireless AP, such as wireless AP 404-2.

At 602, the method may include determining prioritized time-slices for utilizing an RIS device by at least a first wireless AP and a second wireless AP for a WLAN in which the first wireless AP is provided a first prioritized time-slice in which to utilize the RIS device and the second wireless AP is provided a second prioritized time-slice in which to utilize the RIS device.

At 604, the method may include determining that a wireless client having a first communication session involving the first wireless AP is to be transitioned to a second communication session involving the second wireless AP in which the first wireless AP utilizes a first configuration of a plurality of configurable reflecting elements of the RIS device for communications with the wireless client via the first communication session during the first prioritized time-slice for utilizing the RIS device.

At 606, the method may include identifying a second configuration of the plurality of configurable reflecting elements of the RIS device to facilitate the second communication session for the wireless client involving the second wireless AP. In at least one instance, the second configuration of the plurality of configurable reflecting elements of the RIS device can be determined during the second prioritized time-slice for utilizing the RIS device. In at least one instance, the second configuration of the plurality of configurable reflecting elements can be determined through one or more probe exchanges between the second wireless AP and the wireless client. In at least one instance, the second configuration of the plurality of configurable reflecting elements of the RIS device can determined based on historical information indicating a particular configuration of the plurality of configurable reflecting elements of the RIS device based on at least one of a location of the wireless client or signal strength information for the first communication session involving the first wireless AP.

At 608, the method may include triggering the wireless client to roam from the first wireless AP to the second wireless AP for establishing the second communication session involving the second wireless AP in which the second wireless AP utilizes the second configuration of the plurality of configurable reflecting elements of the RIS device for communications with the wireless client via the second communication session during the second prioritized time-slice for utilizing the RIS device.

Figure 7:
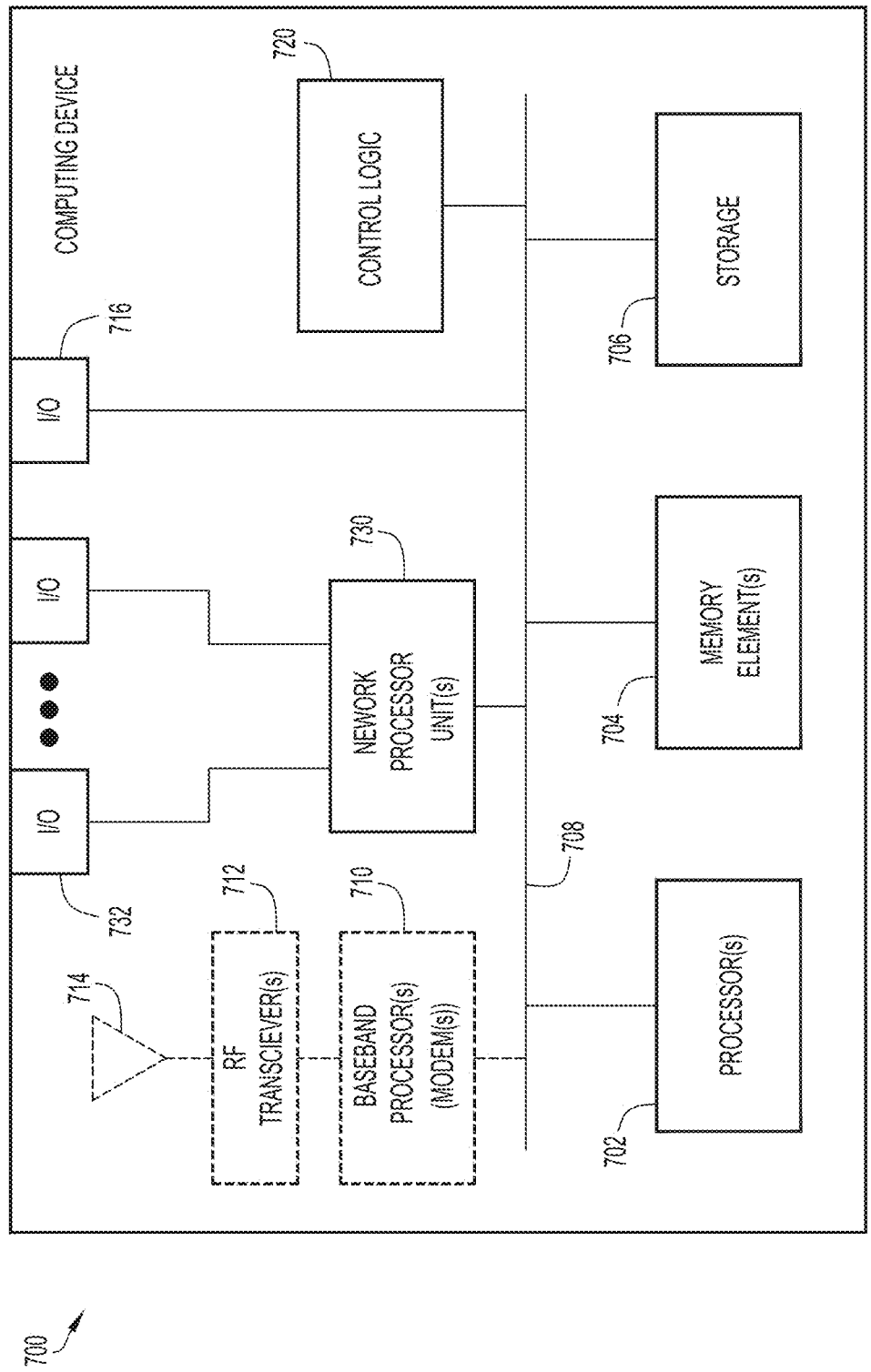
FIG. 7 is a hardware block diagram of a computing device that may perform functions associated with any combination of operations discussed in connection with techniques of embodiments herein.

Referring to FIG. 7, FIG. 7 illustrates a hardware block diagram of a computing device 700 that may perform functions associated with operations discussed herein. In various embodiments, a computing device or apparatus, such as computing device 700 or any combination of computing devices 700, may be configured as any entity/entities as discussed herein, such as a wireless AP (e.g., any of wireless AP 104, 404-1, and/or 404-2), an RIS device (e.g., any of RIS device 110 and/or 410), a WLC (e.g., WLC 102 and/or WLC 402), a wireless client (e.g., any of wireless client 108, 408-1, 408-2, 408-3, 408-4, etc.) and/or any other element, controller, communication element, and/or the like discussed herein in order to perform operations of the various techniques/embodiments discussed herein.

In at least one embodiment, computing device 700 may be any apparatus that may include one or more processor(s) 702, one or more memory element(s) 704, storage 706, a bus 708, one or more I/O interface(s) 716, control logic 720 (e.g., element control logic or RIS control logic, as discussed herein), one or more one network processor unit(s) 730 and one or more network I/O interface(s) 732. In various embodiments, instructions associated with logic for computing device 700 can overlap in any manner and are not limited to the specific allocation of instructions and/or operations described herein.

For embodiments in which computing device 700 may be implemented as any device capable of wireless communications, computing device 700 may further include at least one baseband processor or modem 710, one or more radio RF transceiver(s) 712 (e.g., any combination of RF receiver(s) and RF transmitter(s)), one or more antenna(s) or antenna array(s) 714.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, graphical processing units (GPUs), microprocessors, digital signal processor, baseband signal processor, modem, physical layer (PHY), computing devices, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa) or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that are configured for computing device 700. In at least one embodiment, bus 708 is implemented as a fast kernel-hosted interconnect, potentially using shared memory between processes (e.g., logic), which can enable efficient communication paths between the processes.

Network processor unit(s) 730 may enable communication between computing device 700 and other systems, devices, or entities, via network I/O interface(s) 732 (wired and/or wireless) to facilitate operations discussed for various embodiments described herein. In various embodiments, network processor unit(s) 730 can be configured as a combination of hardware and/or software, such as one or more Ethernet driver(s) and/or computing device(s) or interface cards, Fibre Channel (e.g., optical) driver(s) and/or computing device(s), wireless receivers/transmitters/transceivers, baseband processor(s)/modem(s), and/or other similar network interface driver(s) and/or computing device(s) now known or hereafter developed to enable communications between computing device 700 and other systems, devices, or entities to facilitate operations for various embodiments described herein. In various embodiments, network I/O interface(s) 732 can be configured as one or more Ethernet port(s), Fibre Channel ports, any other I/O port(s), and/or antenna(s)/antenna array(s) now known or hereafter developed. Thus, the network processor unit(s) 730 and/or network I/O interface(s) 732 may include suitable interfaces for receiving, transmitting, and/or otherwise communicating data and/or information (wired and/or wirelessly) in a network environment.

I/O interface(s) 716 allow for input and output of data and/or information with other entities that are connected to computing device 700. For example, I/O interface(s) 716 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen. In some embodiments, the computing device 700 supports a display having touch-screen display capabilities.

For embodiments in which computing device 700 is implemented as a wireless device or any apparatus capable of wireless communications, the RF transceiver(s) 712 may perform RF transmission and RF reception of wireless signals via antenna(s)/antenna array(s) 714, and the baseband processor or modem 710 performs baseband modulation and demodulation, etc. associated with such signals to enable wireless communications for computing device 700.

In various embodiments, control logic 720 (which can include any combination of RIS management logic for a wireless AP, element control logic for an RIS device, etc.) can include instructions that, when executed, cause processor(s) 702 to perform operations, which can include, but not be limited to, providing overall control operations of computing device 700; interacting with other entities, elements, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720 of computing device 700) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) (e.g., memory element(s) 704 of computing device 700) and/or storage (e.g., storage 706 of computing device 700) can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include determining prioritized time-slices for utilizing a Reconfigurable Intelligent Surface (RIS) device by at least a first wireless access point (AP) and a second wireless AP for a wireless local area network, wherein the first wireless AP is provided a first prioritized time-slice in which to utilize the RIS device and the second wireless AP is provided a second prioritized time-slice in which to utilize the RIS device; determining that a wireless client having a first communication session involving the first wireless AP is to be transitioned to a second communication session involving the second wireless AP, wherein the first wireless AP utilizes a first configuration of a plurality of configurable reflecting elements of the RIS device for communications with the wireless client via the first communication session during the first prioritized time-slice for utilizing the RIS device; identifying a second configuration of the plurality of configurable reflecting elements of the RIS device to facilitate the second communication session for the wireless client involving the second wireless AP; and triggering the wireless client to roam from the first wireless AP to the second wireless AP for establishing the second communication session involving the second wireless AP, wherein the second wireless AP utilizes the second configuration of the plurality of configurable reflecting elements of the RIS device for communications with the wireless client via the second communication session during the second prioritized time-slice for utilizing the RIS device.

In one instance, the second configuration of the plurality of configurable reflecting elements of the RIS device is determined during the second prioritized time-slice for utilizing the RIS device. In one instance, the second configuration of the plurality of configurable reflecting elements is determined through one or more probe exchanges between the second wireless AP and the wireless client. In one instance, the second configuration of the plurality of configurable reflecting elements of the RIS device is determined based on historical information indicating a particular configuration of the plurality of configurable reflecting elements of the RIS device based on at least one of a location of the wireless client or signal strength information for the first communication session involving the first wireless AP.

In one instance, the first wireless AP notifies the second wireless AP that the first communication session of the wireless client involving the first wireless AP involves the first wireless AP utilizing the RIS device. In one instance, the first prioritized time-slice provides a larger period of time for utilizing the RIS device by the first wireless AP than the second prioritized time-slice. In one instance, the triggering is initiated based on determining that signal strength or channel quality between the wireless client and the second wireless AP would be improved in comparison to signal strength or channel quality between the wireless client and the first wireless AP. In one instance, the method is performed based on communications between the first wireless AP and the second wireless AP. In one instance, the communications between the first wireless AP and the second wireless AP are facilitated by a controller device that controls both the first wireless AP and the second wireless AP.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IOT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and, in the claims, can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method, comprising:
    determining prioritized time-slices for utilizing a Reconfigurable Intelligent Surface (RIS) device by at least a first wireless access point (AP) and a second wireless AP for a wireless local area network, wherein the first wireless AP is provided a first prioritized time-slice in which to utilize the RIS device and the second wireless AP is provided a second prioritized time-slice in which to utilize the RIS device;
    determining that a wireless client having a first communication session involving the first wireless AP is to be transitioned to a second communication session involving the second wireless AP, wherein the first wireless AP utilizes a first configuration of a plurality of configurable reflecting elements of the RIS device for communications with the wireless client via the first communication session during the first prioritized time-slice for utilizing the RIS device;
    identifying a second configuration of the plurality of configurable reflecting elements of the RIS device to facilitate the second communication session for the wireless client involving the second wireless AP; and
    triggering the wireless client to roam from the first wireless AP to the second wireless AP for establishing the second communication session involving the second wireless AP, wherein the second wireless AP utilizes the second configuration of the plurality of configurable reflecting elements of the RIS device for communications with the wireless client via the second communication session during the second prioritized time-slice for utilizing the RIS device.

2. The method of claim 1, wherein the second configuration of the plurality of configurable reflecting elements of the RIS device is determined during the second prioritized time-slice for utilizing the RIS device.

3. The method of claim 2, wherein the second configuration of the plurality of configurable reflecting elements is determined through one or more probe exchanges between the second wireless AP and the wireless client.

4. The method of claim 1, wherein the second configuration of the plurality of configurable reflecting elements of the RIS device is determined based on historical information indicating a particular configuration of the plurality of configurable reflecting elements of the RIS device based on at least one of a location of the wireless client or signal strength information for the first communication session involving the first wireless AP.

5. The method of claim 1, wherein the first wireless AP notifies the second wireless AP that the first communication session of the wireless client involving the first wireless AP involves the first wireless AP utilizing the RIS device.

6. The method of claim 1, wherein the first prioritized time-slice provides a larger period of time for utilizing the RIS device by the first wireless AP than the second prioritized time-slice.

7. The method of claim 1, wherein the triggering is initiated based on determining that signal strength or channel quality between the wireless client and the second wireless AP would be improved in comparison to signal strength or channel quality between the wireless client and the first wireless AP.

8. The method of claim 1, wherein the method is performed based on communications between the first wireless AP and the second wireless AP.

9. The method of claim 1, wherein the communications between the first wireless AP and the second wireless AP are facilitated by a controller device that controls both the first wireless AP and the second wireless AP.

10. One or more non-transitory computer readable storage media encoded with instructions that, when executed by a processor, cause the processor to perform operations, comprising:
  determining prioritized time-slices for utilizing a Reconfigurable Intelligent Surface (RIS) device by at least a first wireless access point (AP) and a second wireless AP for a wireless local area network, wherein the first wireless AP is provided a first prioritized time-slice in which to utilize the RIS device and the second wireless AP is provided a second prioritized time-slice in which to utilize the RIS device;
  determining that a wireless client having a first communication session involving the first wireless AP is to be transitioned to a second communication session involving the second wireless AP, wherein the first wireless AP utilizes a first configuration of a plurality of configurable reflecting elements of the RIS device for communications with the wireless client via the first communication session during the first prioritized time-slice for utilizing the RIS device;
  identifying a second configuration of the plurality of configurable reflecting elements of the RIS device to facilitate the second communication session for the wireless client involving the second wireless AP; and
  triggering the wireless client to roam from the first wireless AP to the second wireless AP for establishing the second communication session involving the second wireless AP, wherein the second wireless AP utilizes the second configuration of the plurality of configurable reflecting elements of the RIS device for communications with the wireless client via the second communication session during the second prioritized time-slice for utilizing the RIS device.

11. The media of claim 10, wherein the second configuration of the plurality of configurable reflecting elements of the RIS device is determined during the second prioritized time-slice for utilizing the RIS device.

12. The media of claim 11, wherein the second configuration of the plurality of configurable reflecting elements is determined through one or more probe exchanges between the second wireless AP and the wireless client.

13. The media of claim 10, wherein the second configuration of the plurality of configurable reflecting elements of the RIS device is determined based on historical information indicating a particular configuration of the plurality of configurable reflecting elements of the RIS device based on at least one of a location of the wireless client or signal strength information for the first communication session involving the first wireless AP.

14. The media of claim 10, wherein the first wireless AP notifies the second wireless AP that the first communication session of the wireless client involving the first wireless AP involves the first wireless AP utilizing the RIS device.

15. A system comprising:
  at least one memory element for storing data; and
  at least one processor for executing instructions associated with the data, wherein executing the instructions causes the system to perform operations, comprising:
    determining prioritized time-slices for utilizing a Reconfigurable Intelligent Surface (RIS) device by at least a first wireless access point (AP) and a second wireless AP for a wireless local area network, wherein the first wireless AP is provided a first prioritized time-slice in which to utilize the RIS device and the second wireless AP is provided a second prioritized time-slice in which to utilize the RIS device;
    determining that a wireless client having a first communication session involving the first wireless AP is to be transitioned to a second communication session involving the second wireless AP, wherein the first wireless AP utilizes a first configuration of a plurality of configurable reflecting elements of the RIS device for communications with the wireless client via the first communication session during the first prioritized time-slice for utilizing the RIS device;
    identifying a second configuration of the plurality of configurable reflecting elements of the RIS device to facilitate the second communication session for the wireless client involving the second wireless AP; and
    triggering the wireless client to roam from the first wireless AP to the second wireless AP for establishing the second communication session involving the second wireless AP, wherein the second wireless AP utilizes the second configuration of the plurality of configurable reflecting elements of the RIS device for communications with the wireless client via the second communication session during the second prioritized time-slice for utilizing the RIS device.

16. The system of claim 15, wherein the second configuration of the plurality of configurable reflecting elements of the RIS device is determined during the second prioritized time-slice for utilizing the RIS device.

17. The system of claim 16, wherein the second configuration of the plurality of configurable reflecting elements is determined through one or more probe exchanges between the second wireless AP and the wireless client.

18. The system of claim 15, wherein the second configuration of the plurality of configurable reflecting elements of the RIS device is determined based on historical information indicating a particular configuration of the plurality of configurable reflecting elements of the RIS device based on at least one of a location of the wireless client or signal strength information for the first communication session involving the first wireless AP.

19. The system of claim 15, wherein the first wireless AP notifies the second wireless AP that the first communication session of the wireless client involving the first wireless AP involves the first wireless AP utilizing the RIS device.

20. The system of claim 15, wherein the triggering is initiated based on determining that signal strength or channel quality between the wireless client and the second wireless AP would be improved in comparison to signal strength or channel quality between the wireless client and the first wireless AP.

* * * * *